(12) United States Patent
Tamori et al.

(10) Patent No.: US 9,162,161 B2
(45) Date of Patent: *Oct. 20, 2015

(54) FILLER FOR AFFINITY CHROMATOGRAPHY

(75) Inventors: Kouji Tamori, Tokyo (JP); Takayoshi Abe, Tokyo (JP); Yusuke Okano, Tokyo (JP); Masaki Momiyama, Tokyo (JP); Hiroshi Kawai, Tokyo (JP); Satoshi Hyugaji, Tokyo (JP); Tomonori Shiotani, Tokyo (JP); Kazuhiro Ikkyu, Tokyo (JP); Yong Wang, Tokyo (JP)

(73) Assignee: JSR CORPORATION, Tokyo (JP)

( * ) Notice: Subject to any disclaimer, the term of this patent is extended or adjusted under 35 U.S.C. 154(b) by 340 days.

This patent is subject to a terminal disclaimer.

(21) Appl. No.: 13/638,751

(22) PCT Filed: Mar. 29, 2011

(86) PCT No.: PCT/JP2011/057886
§ 371 (c)(1),
(2), (4) Date: Nov. 27, 2012

(87) PCT Pub. No.: WO2011/125674
PCT Pub. Date: Oct. 13, 2011

(65) Prior Publication Data
US 2013/0085199 A1 Apr. 4, 2013

(30) Foreign Application Priority Data
Mar. 31, 2010 (JP) .................................. 2010-081425

(51) Int. Cl.
| B01D 15/04 | (2006.01) |
| B01D 15/08 | (2006.01) |
| B01D 15/38 | (2006.01) |
| C08F 8/00 | (2006.01) |
| C08F 220/26 | (2006.01) |
| B01J 20/26 | (2006.01) |
| B01J 20/286 | (2006.01) |

(52) U.S. Cl.
CPC ........... *B01D 15/3804* (2013.01); *B01J 20/265* (2013.01); *B01J 20/286* (2013.01); *C08F 8/00* (2013.01); *C08F 220/26* (2013.01); *Y10T 428/2982* (2015.01)

(58) Field of Classification Search
USPC .......................................................... 521/149
See application file for complete search history.

(56) References Cited

U.S. PATENT DOCUMENTS

| 5,019,270 A | 5/1991 | Afeyan et al. |
| 5,228,989 A | 7/1993 | Afeyan et al. |
| 5,384,042 A | 1/1995 | Afeyan et al. |
| 5,552,041 A | 9/1996 | Afeyan et al. |
| 5,583,162 A | 12/1996 | Li et al. |
| 5,605,623 A | 2/1997 | Afeyan et al. |
| 5,653,922 A | 8/1997 | Li et al. |
| 5,760,097 A | 6/1998 | Li et al. |
| 5,833,861 A | 11/1998 | Afeyan et al. |
| 5,863,957 A | 1/1999 | Li et al. |
| 6,100,306 A | 8/2000 | Li et al. |
| 2002/0155090 A1 | 10/2002 | Takahashi et al. |
| 2003/0155300 A1 | 8/2003 | Afeyan et al. |
| 2006/0134805 A1 | 6/2006 | Berg et al. |
| 2007/0207500 A1 | 9/2007 | Bian et al. |
| 2009/0298954 A1 | 12/2009 | Hosoya et al. |
| 2010/0063261 A1 | 3/2010 | Bian et al. |
| 2011/0105730 A1 | 5/2011 | Bian et al. |

FOREIGN PATENT DOCUMENTS

| JP | 61 38462 | 2/1986 |
| JP | 1 217035 | 8/1989 |
| JP | 3 9908 | 1/1991 |
| JP | 5 5731 | 1/1993 |
| JP | 5 9233 | 1/1993 |
| JP | 8 278299 | 10/1996 |
| JP | 10 501173 | 2/1998 |
| JP | 2002 239380 | 8/2002 |
| JP | 3316915 | 8/2002 |
| JP | 2003 231648 | 8/2003 |
| JP | 2008 523140 | 7/2008 |
| JP | 2011 256176 | 12/2011 |
| WO | 2007 142331 | 12/2007 |

OTHER PUBLICATIONS

Bayramoglu et al. "Immoboilization of Candida rugosa lipase onto spacer-arm attached poly(GMA-HEMA-EGDMA) microspheres." Food Chemistry. 2005. vol. 92, Issue 2. pp. 261-268.*
Roque et al., "Affinity-based methodologies and ligands for antibody purification: Advances and perspectives," Journal of Chromatography A, 1160, (2007), pp. 44-55.*
International Search Report Issued Jun. 28, 2011 in PCT/JP11/57886 Filed Mar. 29, 2011.

* cited by examiner

*Primary Examiner* — Kara Boyle
(74) *Attorney, Agent, or Firm* — Oblon, McClelland, Maier & Neustadt, L.L.P.

(57) ABSTRACT

Provided is a filler for affinity chromatography having a high dynamic binding capacity for proteins and having excellent alkali resistance and storage stability. The filler for affinity chromatography of the present invention comprises a porous particle consisting of a copolymer of 40 parts to 99.5 parts by mass of (M-1) a methacryloyl group-containing vinyl monomer that contains a hydroxyl group and does not contain an epoxy group, 0.5 parts to 30 parts by mass of (M-2) an epoxy group-containing vinyl monomer, 0 parts to 59.5 parts by mass of (M-3) a methacryloyl group-containing vinyl monomer which is other than the monomers (M-1) and (M-2), and 0 parts to 25 parts by mass of (M-4) a vinyl monomer other than the monomers (M-1), (M-2) and (M-3) (with the proviso that the total amount of the contents of (M-1), (M-2), (M-3) and (M-4) is 100 parts by mass); ring-opened epoxy group obtainable by ring-opening of epoxy group that is contained in the copolymer; and ligand that is bound to the porous particle.

16 Claims, 4 Drawing Sheets

FIG. 1

(SP4Z)
Number of Amino Acid: 258
Mass: 30181.358 (av.) 30163.051(mono.)

MKHHHHHHPMSDYDIPTTENLYFQGAMVVDNKFNKEQQN

AFYEILHLPNLNEEQRNAFIQSLKDDPSQSANLLAEAKKL

NDAQKEFVDNKFNKEQQNAFYEILHLPNLNEEQRNAFIQS

LKDDPSQSANLLAEAKKLNDAQKELVDNKFNKEQQNAFY

EILHLPNLNEEQRNAFIQSLKDDPSQSANLLAEAKKLNDA

QKKLVDNKFNKEQQNAFYEILHLPNLNEEQRNAFIQSLK

DDPSQSANLLAEAKKLNDAQK

US 9,162,161 B2

FILLER FOR AFFINITY CHROMATOGRAPHY

FIELD OF THE INVENTION

The present invention relates to a filler for affinity chromatography useful for protein purification, which has a high dynamic binding capacity for proteins and has excellent alkali resistance, and more particularly, to a specific filler for affinity chromatography useful for, for example, antibody purification.

BACKGROUND OF THE INVENTION

Affinity chromatography plays a key role in the research, development and production of proteins including monoclonal antibodies. A filler for affinity chromatography generally contains a solid phase carrier having ligands that selectively bind to a target molecule. As the ligands on the solid phase carrier used in affinity chromatography show high selectivity to the target molecule, the affinity chromatography enables economic purification with excellent yield at a high speed, as compared to other chromatographic techniques such as ion-exchange chromatography, gel filtration chromatography, and reverse phase liquid chromatography.

Generally, in affinity chromatography for protein purification, since a strongly alkaline aqueous solution such as an aqueous solution of sodium hydroxide is used for the washing in the purification process that is repeatedly carried out, a filler for affinity chromatography is required to have high alkali resistance. Particularly, in a filler for affinity chromatography which uses a protein such as Protein A as a ligand, deterioration of the protein ligand itself, or deterioration reaction between a protein ligand and a residual reactive group on the solid phase carrier proceeds may occur during the washing or storage using a strongly alkaline aqueous solution; and therefore, an enhancement of alkali resistance and storage stability is required. Silica-based fillers that are commonly used in, for example, analytical chromatography are dissolved in a strongly alkaline aqueous solution, and therefore cannot be used repeatedly in affinity chromatography for protein purification.

Under such circumstances, it has been suggested to use agarose particles that have high hydrophilicity, high ligand activity, and a high dynamic binding capacity for a target molecule, as the solid phase carrier of a filler for affinity chromatography (Patent Documents 1 and 2).

As another solid carrier of a filler for affinity chromatography, it has been suggested to use porous particles consisting of a copolymer of styrene-divinylbenzene having excellent alkali resistance (Patent Documents 3 and 4).

Meanwhile, there have been cases in which porous particles consisting of a polymer of a hydroxyl group-containing methacrylate-based vinyl monomer are used in chromatography. However, these examples are all suitable only for gel filtration chromatography or reverse phase liquid chromatography for analytical purposes (Patent Documents 5 and 6).

PRIOR ART DOCUMENTS

Patent Document

Patent Document 1: JP-A-2008-523140
Patent Document 2: JP-A-2009-522580
Patent Document 3: JP-A-08-278299
Patent Document 4: JP-A-10-501173
Patent Document 5: JP-A-2002-239380
Patent Document 6: JP-B-3316915

SUMMARY OF THE INVENTION

Problem to be Solved by the Invention

However, since agarose particles generally have low elastic modulus, the pressure of the column disadvantageously increases when medium flows at a high speed. Furthermore, since agarose particles are generally produced from naturally occurring seaweeds via a long and complicated process, it is difficult to obtain particles with constant product quality. Meanwhile, porous particles consisting of a copolymer of a vinyl monomer such as styrene-divinylbenzene generally have excellent alkali resistance, but due to their low hydrophilicity, the porous particles impart low ligand activity, and the dynamic binding capacity for a target molecule is disadvantageously low. Furthermore, conventional porous particles consisting of a polymer of a hydroxyl group-containing crosslinkable vinyl monomer, which have been used for gel filtration chromatography or reverse phase chromatography, are not likely to balance high dynamic binding capacity and storage stability as required for using as a filler for affinity chromatography.

Thus, it is an object of the present invention to provide a filler for affinity chromatography which shows a high dynamic binding capacity for proteins and excellent alkali resistance and storage stability, by containing porous particle formed of a polymer using particular vinyl monomers, and ligand that binds to the porous particle.

Means for Solving the Problem

The filler for affinity chromatography according to an embodiment of the present invention contains:
 a porous particle formed of a copolymer of:
  40 parts to 99.5 parts by mass of (M-1) a methacryloyl group-containing vinyl monomer that contains a hydroxyl group and does not contain an epoxy group,
  0.5 parts to 30 parts by mass of (M-2) an epoxy group-containing vinyl monomer,
  0 parts to 59.5 parts by mass of (M-3) a methacryloyl group-containing vinyl monomer which is other than the monomers (M-1) and (M-2), and
  0 parts to 25 parts by mass of (M-4) a vinyl monomer other than the monomers (M-1), (M-2) and (M-3) (with the proviso that the total amount of the contents of (M-1), (M-2), (M-3) and (M-4) is 100 parts by mass);
 ring-opened epoxy group obtainable by ring-opening of epoxy group that is contained in the copolymer; and
 ligand that is bound to the porous particle.

In regard to the filler for affinity chromatography, the ligand may be an alkali-resistant immunoglobulin binding protein.

In regard to the filler for affinity chromatography, the (M-1) methacryloyl group-containing vinyl monomer that contains a hydroxyl group, does not contain an epoxy group, may be a monomer represented by the following formula (A):

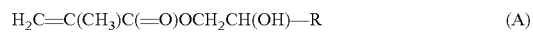

$$H_2C=C(CH_3)C(=O)OCH_2CH(OH)-R \qquad (A)$$

(wherein R represents a hydrogen atom or a monovalent organic group.)

In this case, R in the formula (A) may be a hydroxymethyl group or a methacryloyloxymethyl group.

In regard to the filler for affinity chromatography, the particle size of the porous particle may be 35 μm to 100 μm.

The method for isolating an immunoglobulin according to another embodiment of the present invention includes:
 a step of using the filler for affinity chromatography described above to adsorb an immunoglobulin to the filler;

a step of eluting the immunoglobulin; and
a step of washing the filler with an alkaline liquid.

The column according to another embodiment of the present invention is a packed column for affinity chromatography that is packed with the filler for affinity chromatography.

Effects of the Invention

The filler for affinity chromatography of the present invention shows a high dynamic binding capacity for proteins, excellent alkali resistance and storage stability. Furthermore, when the filler for affinity chromatography is used in, for example, the purification of immunoglobulins, the dynamic binding capacity for immunoglobulins is not easily reduced even if the filler is repeatedly used, and therefore, purification of immunoglobulins can be carried out at low cost.

BRIEF DESCRIPTION OF DRAWINGS

FIG. 1 is a diagram illustrating the amino acid sequence of the immunoglobulin binding protein (SP4Z) prepared in Example 1 of the present invention.

DETAILED DESCRIPTION OF THE INVENTION

Figure 2:
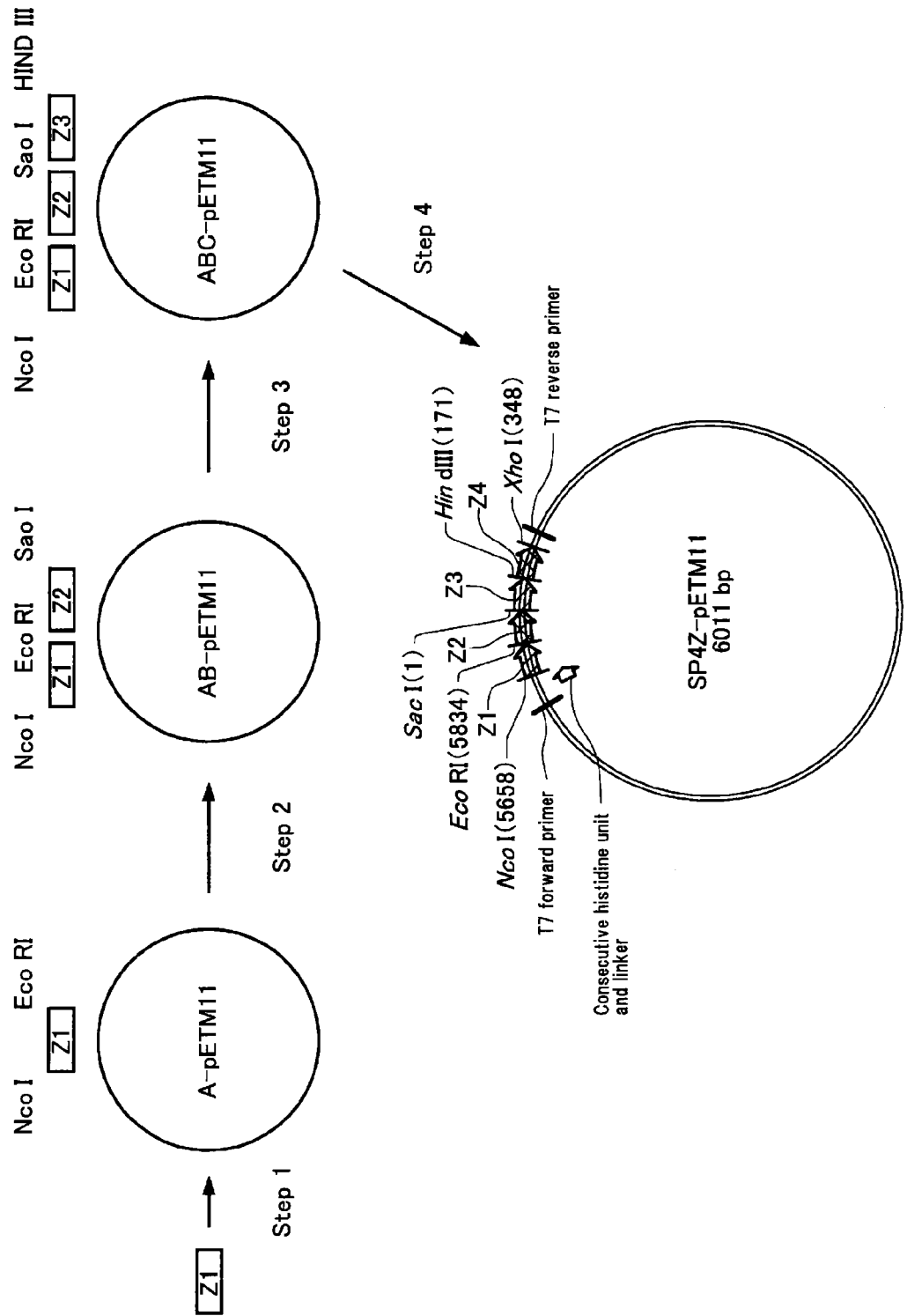
FIG. 2 is a diagram explaining the configuration of a DNA fragment, that encodes the immunoglobulin binding protein of Example 1 of the present invention and is inserted into an expression vector (pETM-11)

Hereinafter, the filler for affinity chromatography of the present invention will be described in more detail.

1. Filler for Affinity Chromatography 1.1. Constitution of Porous Particle

The porous particle constituting the filler for affinity chromatography of the present invention is formed of a copolymer of:
40 parts to 99.5 parts by mass of (M-1) a methacryloyl group-containing vinyl monomer that contains a hydroxyl group and does not contain an epoxy group;
0.5 parts to 30 parts by mass of (M-2) an epoxy group-containing vinyl monomer;
0 parts to 59.5 parts by mass of (M-3) a methacryloyl group-containing vinyl monomer which is other than the monomers (M-1) and (M-2); and
0 parts to 25 parts by mass of (M-4) a vinyl monomer other than the monomers (M-1), (M-2) and (M-3) (with the proviso that the total amount of the contents of (M-1), (M-2), (M-3) and (M-4) is 100 parts by mass), and
has ring-opened epoxy group that is obtainable by ring-opening of epoxy group contained in the copolymer. Hereinafter, the porous particle is referred to as a carrier particle prior to ligand binding.

1.1.1. (M-1) Methacryloyl Group-Containing Vinyl Monomer that Contains Hydroxyl Group and does not Contain Epoxy Group The (M-1) methacryloyl group-containing vinyl monomer that contains a hydroxyl group and does not contain an epoxy group is a vinyl monomer which has one or more methacryloyl groups and one or more hydroxyl groups in one molecule, and does not contain any epoxy group. When the monomer (M-1) is used in a particular amount to hydrophilize porous particles, and these particles are incorporated, a filler for affinity chromatography showing a high dynamic binding capacity for proteins and having excellent alkali resistance can be obtained.

Hereinafter, the (M-1) methacryloyl group-containing vinyl monomer that contains a hydroxyl group and does not contain an epoxy group will be described separately as (M-1-1) a hydroxyl group-containing non-crosslinkable vinyl monomer having one methacryloyl group in one molecule, and (M-1-2) a hydroxyl group-containing crosslinkable vinyl monomer having two or more methacryloyl groups in one molecule.

Examples of the (M-1-1) hydroxyl group-containing non-crosslinkable vinyl monomer having one methacryloyl group in one molecule include glycerol monomethacrylate, trimethylolethane monomethacrylate, trimethylolpropane monomethacrylate, butanetriol monomethacrylate, pentaerythritol monomethacrylate, dipentaerythritol monomethacrylate, inositol monomethacrylate, hydroxyethyl methacrylate, hydroxypropyl methacrylate, hydroxyethyl methacrylamide, and polyethylene glycol methacrylester. Among these, a monomer represented by formula (A) is preferred.

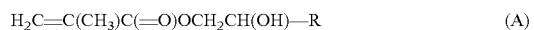

$$H_2C=C(CH_3)C(=O)OCH_2CH(OH)-R \quad (A)$$

(wherein R represents a hydrogen atom or a monovalent organic group.)

In the formula (A), when R is a monovalent organic group which does not have a methacryloyl group, R is preferably a C1 to C8 organic group. Preferred examples of the monomer (M-1-1) include glycerol monomethacrylate, 2-hydroxyethyl methacrylate, and 2-hydroxypropyl methacylate, and glycerol monomethacrylate in which R corresponds to a hydroxymethyl group is most preferred.

Examples of the (M-1-2) hydroxyl group-containing crosslinkable vinyl monomer having two or more methacryloyl groups in one molecule include, preferably, di-substituted or higher-substituted methacrylates of various saccharides, methacrylates of polyhydric alcohols, and methacrylamides of polyhydric alcohols. Specific examples include glycerin dimethacrylate, trimethylolethane dimethacrylate, trimethylolpropane dimethacrylate, butanetriol dimethacrylate, pentaerythritol dimethacrylate, pentaerythritol trimethacrylate, dipentaerythritol dimethacrylate, dipentaerythritol trimethacrylate, dipentaerythritol tetramethacrylate, dipentaerythritol pentamethacrylate, inositol dimethacrylate, inositol trimethacrylate, and inositol tetramethacrylate. Other examples include di-substituted or higher-substituted methacrylates of various saccharides, such as glucose dimethacrylate, glucose trimethacrylate, glucose tetramethacrylate, mannitol dimethacrylate, mannitol trimethacrylate, mannitol tetramethacrylate, and mannitol pentamethacrylate. Further examples include hydroxyl group-containing crosslinkable vinyl monomers having a structure similar to dehydration condensation reaction products between methacrylic acid and polyhydric aminoalcohols such as diaminopropanol, trishydroxymethylaminomethane and glucosamine.

Among them, a compound represented by the formula (A) is more preferred.

In the formula (A), R is preferably a C1 to C8 organic group. Such a monomer (M-1-2) is most preferably glycerin dimethacrylate in which R corresponds to a methacryloyloxymethyl group.

The amount of use of the (M-1) methacryloyl group-containing vinyl monomer that contains a hydroxyl group and does not contain an epoxy group is 40 parts to 99.5 parts by mass, and preferably 45 parts to 95 parts by mass, relative to 100 parts by mass of the total amount of the monomers constituting the copolymer. If the content of the monomer (M-1) is less than 40 parts by mass, the ligand activity may be decreased, and therefore, the dynamic binding capacity for proteins is reduced. If the content is greater than 99.5 parts by mass, since the content of the monomer (M-2) is less than 0.5 parts by mass, the amount of ligand binding is reduced, and the dynamic binding capacity for proteins is decreased. Further, the monomers (M-1-1) and (M-1-2) may be used in combination as the monomer (M-1), but preferably only the monomer (M-1-1) is used.

1.1.2. (M-2) Epoxy Group-Containing Vinyl Monomer

The (M-2) epoxy group-containing vinyl monomer is a monomer having one or more polymerizable vinyl groups (groups having ethylenically unsaturated bonds) and one or more epoxy groups in one molecule. The epoxy group-containing vinyl monomer is an essential component for obtaining an appropriate amount of ligand binding by introducing an appropriate amount of epoxy groups to the porous particles formed from a copolymer thus obtainable.

Regarding the (M-2) epoxy group-containing vinyl monomer, monomers having one polymerizable vinyl group and one epoxy group in one molecule are industrially easily available. Examples of such an epoxy group-containing vinyl monomer include (meth)acrylic acid esters such as glycidyl (meth)acrylate, 4-hydroxybutyl (meth)acrylate glycidyl ether, 3,4-epoxycyclohexylmethyl (meth)acrylate, and α-(meth)acryl-ω-glycidyl polyethylene glycol; aromatic vinyl compounds such as vinylbenzyl glycidyl ether; allyl glycidyl ether, 3,4-epoxy-1-butene, and 3,4-epoxy-3-methyl-1-butene. Glycidyl (meth)acrylate and 4-hydroxybutyl acrylate glycidyl ether are preferred, and glycidyl methacrylate is particularly preferred.

In addition to them, a methacryloyl group-containing vinyl monomer that contains hydroxyl group and epoxy group can also be used as the monomer (M-2). Examples of such a monomer include glycerin monomethacrylate glycidyl ether, and pentaerythritol dimethacrylate glycidyl ether.

The amount of use of the (M-2) epoxy group-containing vinyl monomer is 0.5 parts to 30 parts by mass, and preferably 1 part to 20 parts by mass, relative to 100 parts by mass of the total amount of the monomers constituting the copolymer. If the content of the monomer (M-2) is less than 0.5 parts by mass, the amount of ligand binding is reduced, and the dynamic binding capacity for proteins is decreased. If the content is greater than 30 parts by mass, the ligand activity is decreased during storage, and the dynamic binding capacity for proteins is reduced.

1.1.3. (M-3) Methacryloyl Group-Containing Vinyl Monomer which is Other than (M-1) and (M-2)

Specific examples of the (M-3) methacryloyl group-containing vinyl monomer which is other than the monomers (M-1) and (M-2), include (M-3-1) a non-hydroxyl group-containing non-crosslinkable vinyl monomer having one methacryloyl group in one molecule, and (M-3-2) a non-hydroxyl group-containing crosslinkable vinyl monomer having two or more methacryloyl groups in one molecule. The vinyl monomers will be described in detail below.

The (M-3-1) no-hydroxyl group-containing non-crosslinkable vinyl monomer having one methacryloyl group in one molecule is preferably a nonionic monomer from the viewpoint of preventing non-specific adsorption of foreign proteins at the time of purification. Examples of such a nonionic monomer include methacrylates such as methyl methacrylate, ethyl methacrylate, butyl methacrylate, cyclohexyl methacrylate, and methoxyethyl methacrylate; and methacrylamides such as methacrylamide, dimethylmethacrylamide, methacryloylmorpholine, and diacetone methacrylamide. However, even in the case of nonionic monomers, hydrophobic methacrylates such as 2-ethylhexyl methacrylate and stearyl methacrylate may increase non-specific adsorption of foreign proteins at the time of purification, and therefore, it is not preferable.

Examples of the (M-3-2) non-hydroxyl group-containing crosslinkable vinyl monomer having two or more methacryloyl groups in one molecule include ethylene glycol dimethacrylate, diethylene glycol dimethacrylate, triethylene glycol dimethacrylate, tetraethylene glycol dimethacrylate, propylene glycol dimethacrylate, dipropylene glycol dimethacrylate, tripropylene glycol dimethacrylate, tetrapropylene glycol dimethacrylate, 1,4-butanediol dimethacrylate, 1,6-hexanediol dimethacrylate, trimethylolpropane trimethacrylate, and pentaerythritol tetramethacrylate. From the viewpoint of obtaining satisfactory porosity by using a relatively small amount, and thus preventing restriction on the amount of the monomer (M-1) used, trimethylolpropane trimethacrylate is particularly preferred.

The amount of use of the (M-3) methacryloyl group-containing vinyl monomer which is other than the monomers (M-1) and (M-2) is 0 parts to 59.5 parts by mass, and preferably 0 parts to 50 parts by mass, relative to 100 parts by mass of the total amount of the monomers constituting the copolymer. If the content of the monomer (M-3) is greater than 59.5 parts by mass, the ligand activity is decreased, and thus, the dynamic binding capacity for proteins is reduced.

1.1.4. (M-4) Vinyl Monomer Other than Monomers (M-1), (M-2) and (M-3)

The (M-4) vinyl monomer other than the monomers (M-1), (M-2) and (M-3) is a residual vinyl monomer other than the monomers (M-1), (M-2) and (M-3). This monomer can be used in an amount of 25 parts by mass or less, to the extent that the high dynamic binding capacity and excellent alkali resistance intended by the present invention are not impaired. Examples of the monomer (M-4) include, as non-crosslinkable monomers, ethylene, propylene, styrene, vinyl acetate, and N-vinylacetamide; and as crosslinkable monomers, divinylbenzene, butadiene, diallyl isocyanurate, and triallyl isocyanurate. Divinylbenzene is a monomer effective for increasing the hardness of the porous particles and for decreasing the pressure of the chromatography column. If the content of the monomer (M-4) is greater than 25 parts by mass, the dynamic binding capacity for proteins decreases, or alkali resistance decreases.

In addition to them, a specific example of suitable amount ratios for the monomers that constitute a preferred copolymer includes a copolymer containing:

45 parts to 95 parts by mass of the (M-1) methacryloyl group-containing vinyl monomer that contains a hydroxyl group and does not contain an epoxy group;

1 part to 20 parts by mass of the (M-2) epoxy group-containing vinyl monomer;

0 parts to 50 parts by mass of the (M-3) methacryloyl group-containing vinyl monomer which is other than the monomers (M-1) and (M-2); and 0 parts to 25 parts by mass of the (M-4) vinyl monomer other than the monomers (M-1), (M-2) and (M-3) (with the proviso that the total amount of the contents of the monomers (M-1), (M-2), (M-3) and (M-4) is 100 parts by mass).

1.1.5. Production of Porous Particles

The porous particle can be produced by, for example, known methods of seed polymerization, suspension polymerization. The two-stage swelling polymerization method disclosed in JP-B-57-24369 may be suitably used as the seed polymerization method. During the polymerization, in addition to the above monomers, water and porogens are used as essential components, and, for example, a polymerization initiator, a polymer dispersant, a surfactant, a salt, seed particles, a water-soluble polymerization inhibitor are used as necessary.

A preferred polymerization method for the production of porous particles is a method for suspension polymerization of a water-based mixture which contains, as essential components:

100 parts by mass of the monomer mixture described above ((M-1) and (M-2), and if necessary, (M-3) and/or (M-4)), and (P-1) at least one porogen selected from linear, branched or cyclic, C7 to C14 alcohol, ether, aldehyde, ketone and ester, and C8 to C10 alkylbenzene.

(P-2), porogen other than the (P-1), may also be used in combination. The amount of the porogens used is preferably 100 parts to 400 parts by mass in total relative to 100 parts by mass of the monomers. The amount of the component (P-1) used is preferably 10% by mass or more relative to 100% by mass of the total amount of the porogens.

Specific examples of the porogen (P-1) include:

as alcohols, 1-heptanol, 2-heptanol, 3-heptanol, 4-heptanol, 2,4-dimethyl-3-pentanol, 5-methyl-2-hexanol, 2-ethyl-1-hexanol, 2-octanol, 3-octanol, 5-methyl-3-heptanol, 1-nonanol, and 3,5,5-trimethylhexanol;

as ethers, hexyl methyl ether, dibutyl ether, and cineole;

as aldehydes, heptanal, octanal, 2-ethyl-1-hexanal, nonanal, 3,5,5-trimethylhexanal, 1-decanal, and dodecanal;

as ketones, 2-heptanone, 3-heptanone, 4-heptanone, 2,4-dimethyl-3-pentanone, 4,4-dimethyl-2-pentanone, 5-methyl-2-hexanone, 2-octanone, 3-octanone, 5-methyl-3-heptanone, 2,6-dimethyl-4-heptanone, 2-nonanone, 3-nonanone, 4-nonanone, 3,3,5-trimethylcyclohexanone, 2-decanone, 3-decanone, 2-undecanone, 4-t-pentylcyclohexanone, 2-hexylcyclopentanone, 2-heptylcyclopentanone, and dicyclohexyl ketone;

as esters, hexyl formate, pentyl acetate, isopentyl acetate, butyl propionate, isobutyl propionate, propyl butyrate, isopropyl butyrate, propyl isobutyrate, isopropyl isobutyrate, ethyl valerate, ethyl isovalerate, ethyl pivalate, methyl hexanoate, hexyl acetate, cyclohexyl acetate, 2-ethylbutyl acetate, isopentyl propionate, butyl butyrate, butyl isobutyrate, isobutyl butyrate, isobutyl isobutyrate, propyl valerate, propyl isovalerate, ethyl hexanoate, methyl heptanoate, heptyl acetate, hexyl propionate, pentyl butyrate, isopenyl butyrate, pentyl isobutyrate, isopentyl isobutyrate, isobutyl valerate, propyl hexanoate, isopropyl hexanoate, ethyl heptanoate, methyl octanoate, octyl acetate, isooctyl acetate, 2-ethylhexyl acetate, hexyl butyrate, cyclohexyl butyrate, pentyl valerate, isopentyl valerate, butyl hexanoate, isobutyl hexanoate, ethyl octanoate, methyl nonanoate, nonyl acetate, pentyl hexanoate, ethyl nonanoate, propyl 2-ethylhexanoate, ethyl 3,5,5-trimethylhexanoate, methyl decanoate, δ-dodecanolactone, decyl acetate, ethyl decanoate, citronellyl acetate, methyl dodecanoate, dodecyl acetate, and ethyl dodecanoate; and as alkylbenzenes, xylene, ethylbenzene, cumene, n-propylbenzene, n-butylbenzene, t-butylbenzene, sec-butylbenzene, isobutylbenzene, ethyltoluene, cymene, and mesitylene.

From the viewpoint of maintaining the ligand activity at a high level without inhibiting hydrophilicity, the porogen of (P-1) is preferably alcohol, ether, aldehyde, ketone, or ester; more preferably ketone or ester; and most preferably C7 to C10 ketone or ester.

The component (P-2) is a porogen other than the component (P-1), and is a component which may be added to regulate the pore volume of the porous particles. The solubility of the component (P-2) in water at 20° C. is preferably 200 or less.

If the (P-2) porogens of less than alcohols, ethers, aldehydes, ketones and esters, and less than C8 alkylbenzenes are contained as main components in composition, a large pore diameter that is suitable for protein isolation or the like may not be obtained, and the pore volume may become small. If the constitution of porogens includes more than C14 alcohols, ethers, aldehydes, ketones and esters and more than C10 alkylbenzenes as main components, the pore volume may become small, or non-porous fine particles may be formed.

The total amount of the porogens including the component (P-1) is usually 100 parts to 400 parts by mass, and preferably 150 parts to 300 parts by mass, relative to 100 parts by mass of the monomer mixture. If the total amount of the porogens is less than 100 parts by mass, a large pore diameter suitable for, for example, protein isolation, may not be obtained, and the pore volume may become small. If the total amount of the porogens is greater than 400 parts by mass, the pore volume may become excessively large, or non-porous fine particles may be formed.

The amount of the component (P-1) is preferably 10% by mass or greater, and more preferably 20% by mass or greater, relative to 100% by mass of the total amount of porogens. If the total amount of (P-1) is less than 10% by mass of the total amount of porogens, the pore volume may become small.

The polymerization solvent for suspension polymerization is water. An organic solvent such as alcohol may be contained in water to the extent that the effect of the present invention is not impaired. The amount of water is preferably 200 parts to 10,000 parts by mass, and more preferably 500 parts to 5,000 parts by mass, relative to 100 parts of the total amount of monomers. When the amount of water is within the aforementioned range, association between the particles during polymerization is suppressed, so that the particle size is easily controlled, and excellent productivity is obtained.

Examples of the polymerization initiator that can be used include water-soluble initiators, including persulfates such as potassium persulfate, sodium persulfate and ammonium persulfate, hydrogen peroxide, t-butyl hydroperoxide, t-butyl peroxymaleic acid, succinic acid peroxide, and 2,2'-azobis[2-N-benzylamidino]propane hydrochloride; oil-soluble initiators such as benzoyl peroxide, lauroyl peroxide, cumene hydroperoxide, diisopropyl peroxydicarbonate, cumyl peroxyneodecanoate, cumyl peroxyoctanoate, t-butyl peroxy-2-ethylhexanoate, 3,5,5-trimethylhexanoyl peroxide, azobisisobutyronitrile, and azobisisovaleronitrile; and redox-based initiators that use both an organic peroxide and a reducing agent such as sodium sulfite, rongalite, and sodium ascorbate. The polymerization initiator is preferably an oil-soluble initiator or an oil-soluble redox initiator, and from the view point of productivity, the polymerization initiator is more preferably an oil-soluble initiator. The amount of the polymerization initiator is preferably 0.01 parts to 10 parts by mass, and more preferably 0.05 parts to 5 parts by mass, relative to 100 parts by mass of the total amount of monomers. These polymerization initiators may be supplied to a polymerization system after being dissolved in water, a monomer mixture or a porogen, or may also be added to a polymerization system at room temperature or under heating alone. When an initiator exhibiting acidity or basicity such as a persulfate is used during polymerization, and hydrolysis of epoxy groups is necessary to be prevented, it is preferable to carry out suspension polymerization in a buffer solution which maintains the pH near neutrality. It is also possible to carry out suspension polymerization without using an initiator, by using, for example, ultraviolet radiation, an electron beam, and it is also possible to use a known photoradical initiator.

As the polymer dispersant, a water-soluble polymer such as a polyvinyl alcohol having a degree of saponification of 80% to 95%, or polyvinylpyrrolidone, can be used.

As the surfactant, anionic surfactants such as sodium dodecyl sulfate, sodium dodecyl benzenesulfonate, and polyoxyethylene dodecyl ether sulfuric acid ester salt; and nonionic surfactants such as polyoxyethylene alkyl ether can be used.

As the salt, sodium chloride, sodium sulfate, sodium carbonate and the like can be suitably used.

As the seed particles, polystyrene particles, polyalkyl (meth)acrylate particles and the like, each having a weight average molecular weight of about 1,000 to 100,000, can be used.

As the water-soluble polymerization inhibitor, iodides such as potassium iodide, nitrites such as sodium nitrite, thiosulfates such as sodium thiosulfate, and water-soluble quinone compounds such as sulfonated naphthohydroquinone ammonium salt can be suitably used.

In the process of seed polymerization, porous particle having a particle size that is essential to the filler for affinity chromatography of the present invention can be obtained by adjusting the size and amount of the seed particles, the amount of the monomers, and the amount of the porogen. In the process of suspension polymerization, porous particles having a particle size that is essential to the filler for affinity chromatography of the present invention can be obtained by adjusting the type and amount of the polymer dispersant and the surfactant, the stirring speed, the stirring blade, and the shape and size of the polymerization vessel.

It is known that the pore volume of the porous particles can be adjusted by changing the ratio of the monomers and the porogen. In addition, the pore volume of the porous particles can be adjusted by changing, for example, the type and amount of the salt or polymerization inhibitor used at the time of polymerization, the polymerization temperature. The pore volume of the porous particles as a filler for affinity chromatography can be adjusted by changing the pore volume of the porous particles prior to ligand binding, and the amount of the ligand to be bound.

The temperature and time required for polymerization are, in the case of using an initiator other than a redox-based initiator, preferably 30 minutes to 24 hours at 40° C. to 100° C., and more preferably 1 hour to 10 hours at 60° C. to 90° C.

After completion of the polymerization, it is preferable to wash the porous particles with a good solvent for the seed particles and/or the porogen, from the viewpoint that the binding of a ligand that will be described below is facilitated. For example, acetone, ethanol, isopropyl alcohol can be suitably used as a washing solvent. Furthermore, if necessary, the porous particles may be dispersed by using, for example, an ultrasonic disperser, before or after washing. Further, it is preferable to remove small particles or coarse particles by methods such as decantation and filtration, from the viewpoint of improving the pressure characteristics or improving the dynamic binding capacity for proteins.

1.1.6. Epoxy Group Content

The epoxy group contained in the porous particles prior to ligand binding is a functional group for binding to a ligand, and is also a functional group that serves as a source for an enhancement of the hydrophilicity of the filler for affinity chromatography after ring-opening. The epoxy group content of the porous particles prior to ligand binding is preferably 0.05 mmol/g to 2.0 mmol/g, more preferably 0.08 mmol/g to 1.5 mmol/g, and most preferably 0.10 mmol/g to 1.0 mmol/g. When the epoxy group content of the porous particles prior to ligand binding is 0.05 mmol/g or more, the amount of ligand binding is at an adequate level, and a decrease of the dynamic binding capacity for proteins is prevented. Furthermore, when the epoxy group content of the porous particles prior to ligand binding is 2 mmol/g or less, a decrease of the ligand activity during storage is prevented, accordingly, a decrease of the dynamic binding capacity for proteins is also prevented. The epoxy group content of the porous particles prior to ligand binding can be quantitatively determined by the steps of: adding an excess amount of hydrochloric acid (or a salt containing chloride ions) to the porous particles for ring-opening of the epoxy groups by addition reaction with hydrochloric acid; neutralizing the remaining hydrochloric acid with an excess amount of a base (for example, an aqueous sodium hydroxide solution), and then performing back-titration of the remaining sodium hydroxide with hydrochloric acid. The epoxy group content of the porous particles prior to ligand binding can be adjusted by, for example, the amount of the epoxy group-containing vinyl monomer, the polymerization temperature, the polymerization time, pH of the polymerization liquid, and also by the ring-opening treatment after polymerization.

1.2. Constitution of Filler for Affinity Chromatography

The filler for affinity chromatography of the present invention contains porous particles consisting of a copolymer of the monomers described above and having ring-opened epoxy groups obtainable by ring-opening the epoxy groups contained in the copolymer, and ligand bound to the porous particles.

1.2.1. Ligand

The type of ligand is not particularly limited as long as the ligand has appropriate affinity to the target molecule. For example, proteins such as Protein A, protein G and avidin; peptides such as insulin; antibodies such as monoclonal antibodies; enzymes; hormones; DNA; RNA; carbohydrates such as heparin, Lewis X, and gangliosides; and low molecular weight compounds such as iminodiacetic acid, synthetic dyes, 2-aminophenylboronic acid, 4-aminobenzamidine, glutathione, biotin, and derivatives thereof, can be used. The above exemplified ligands may be used as a whole molecule, alternatively, the fragments thereof obtainable by, for example, recombination, enzyme treatments may also be used. Artificially synthesized peptides or peptide derivatives may also be used.

Examples of a ligand suitable for the separation or purification of an immunoglobulin include Protein A and protein G, the ligand is more preferably an immunoglobulin binding domain of Protein A, and the most preferably a protein in which a peptide containing four or more consecutive histidine units has been added to an end of an immunoglobulin binding domain of Protein A. Examples of such a protein include immunoglobulin binding proteins represented by the following formula (1) and formula (2).

The term "protein" in the present invention means any molecule having a peptide structural unit, and conceptually including, for example, partial fragments of wild type proteins, and mutants obtained by artificially modifying the amino acid sequences of wild type proteins. Furthermore, an "immunoglobulin binding domain" means a functional unit of a polypeptide having an immunoglobulin binding activity by itself, and an "immunoglobulin binding protein" means a protein which has specific affinity to an immunoglobulin and includes the "immunoglobulin binding domain." The term "immunoglobulin binding" means binding to a region other than the complementarity determining region (CDR) of an immunoglobulin molecule, particularly binding to the Fc fragment. The term "ligand" used in relation to affinity chromatography in the present invention means a molecule which binds to a target substance of affinity chromatography.

1.2.2. Immunoglobulin Binding Domain

The immunoglobulin binding domain of Protein A may be a wild type immunoglobulin binding domain or a recombinant type immunoglobulin binding domain. The immunoglobulin binding domain of Protein A is preferably at least one kind selected from the group consisting of an A domain, a B domain, a C domain, a D domain, an E domain, and a Z domain. Examples of the amino acid sequences of the A domain, the B domain, the C domain, the D domain and the E domain are described in FIG. 1 of Moks T, Abrahms L, et al., Staphylococcal Protein A consists of five IgG-binding domains, Eur J Biochem. 1986, 156, 637-643. The disclosure of this document is incorporated herein by reference. Furthermore, proteins having amino acid sequences each with an identity of at least 70% (preferably, at least 90%) with the respective amino acid sequences of the domains described in the above document, can also be used as the immunoglobulin binding domain of Protein A according to the present invention.

The recombinant immunoglobulin binding domain may be considered to have an immunoglobulin binding activity that is equivalent to that of a non-recombinant immunoglobulin binding domain. For example, it is preferable that the amino acid sequence of the recombinant immunoglobulin binding domain retain an identity of at least 70% (preferably, at least 90%) with the amino acid sequence of wild type immunoglobulin binding domain of Protein A. Specific examples include the Z domain (SEQ ID NO: 1) disclosed in Nilsson B. et al., Protein Engineering, 1987, Vol. 1, No. 2, pp. 107 to 113; and the alkali-resistant mutant of the Z domain disclosed in U.S. Patent Application No. 2006/0194955 A1 by Hober et al.

The ligand used for the filler for affinity chromatography of the present invention may have plural the same or different kinds of immunoglobulin binding domains.

For example, the ligand may include (D domain-A domain)n (wherein n represents an integer of 1 or greater (preferably 1 to 6), and there may be an optional amino acid sequence between the D domain and the A domain), as an immunoglobulin binding domain of Protein A, that is, the ligand may include a repeating unit containing the A domain and the D domain. Furthermore, because the filler for affinity chromatography of the present invention has opportunity of being brought into contact with an alkaline aqueous solution during use, the ligand may include a repeating unit which contains the Z domain of Protein A.

Furthermore, in the present invention, the ligand may include one or more of the above domains, or fragments or mutants thereof.

According to the present invention, a fragment of an immunoglobulin binding domain referred to a fragment which has a portion of the amino acid sequence of the corresponding domain and has immunoglobulin binding activity. Preferably, a fragment of an immunoglobulin binding domain referred to a fragment which has a sequence identity of at least 90%, and more preferably at least 95%, with the amino acid sequence of the corresponding domain and has immunoglobulin binding activity. Furthermore, according to the present invention, the mutant of an immunoglobulin binding domain means a mutant which has a sequence identity of at least 90%, and more preferably at least 95%, with the amino acid sequence of the corresponding domain and has immunoglobulin binding activity.

For example, the ligand used in the present invention may contain at least one selected from the Z domain, or a fragment or a mutant thereof. Descriptions on the Z domain are given in Nilsson B. et al., Protein Engineering, 1987, Vol. 1, No. 2, pp. 107 to 113.

Furthermore, according to the present invention, the ligand may contain one or more (preferably 4 to 10) of the Z domain, or fragment or mutant thereof.

Examples of the mutant Z domain include proteins having the sequences disclosed in Japanese Patent No. 4391830. For example, claim 1 of Japanese Patent No. 4391830 describes a protein which contains two or more repeating units defined by SEQ ID NO: 1 (Z domain) and has a threonine residue as the 23th amino acid residue.

Furthermore, a fragment of the Z domain (Z fragment) means a fragment which includes a portion of the amino acid sequence of the Z domain, for example, preferably includes 90% or more, and more preferably 95% or more, of the amino acid sequence of the Z domain, and has immunoglobulin binding activity. Furthermore, mutant Z domain means a mutant which has, for example, an identity of at least 90%, and preferably an identity of at least 95%, with the amino acid sequence of the Z domain, and has immunoglobulin binding activity. The mutant Z domain preferably has improved alkali resistance as compared with the Z domain. In this case, determination of whether a mutant of the Z domain has improved alkali resistance as compared with the Z domain or not can be determined by the method described below in the Examples.

1.2.3. Immunoglobulin Binding Protein 1

An immunoglobulin binding protein as a preferred example of the ligand is represented by the following formula (1) (hereinafter, referred to as "protein 1").

$$R-R^2 \qquad (1)$$

(wherein R represents an amino acid sequence consisting of 4 to 300 amino acid residues and containing a region of 4 to 20 consecutive histidine residues; and $R^2$ represents an amino acid sequence consisting of 50 to 500 amino acid residues and containing at least one immunoglobulin binding domain of Protein A (wherein the end at which $R^2$ binds to R is the C-terminus or the N-terminus of the immunoglobulin binding domain)).

The number of amino acid residues included in the amino acid sequence represented by R in the formula (1) is preferably 8 to 100, and the number of histidine residues in the region of consecutive histidine residues included in R is preferably 4 to 8. Furthermore, the number of amino acid residues included in the amino acid sequence represented by $R^2$ in the formula (1) is preferably 120 to 480.

It is preferable that either or both of the amino acid sequence represented by R and the amino acid sequence represented by $R^2$ in the formula (1) contain a domain t, that consists of 1 to 50 amino acid residues and contains one amino acid selected from lysine, arginine, and cysteine. In this case, the amino acid sequence may contain plural, the same or different domain t.

Furthermore, R— in the formula (1) is preferably a group represented by the following formula (2):

$$R^1\text{-}r\text{-} \qquad (2)$$

(wherein $R^1$ represents an amino acid sequence consisting of 4 to 100 amino acid residues and containing a region of 4 to 20 consecutive histidine residues (with the proviso that, in $R^1$, an end of the region of consecutive histidine residues is bonded to r); and r represents an arbitrary amino acid sequence consisting of 7 to 200 amino acid residues.)

The number of amino acid residues included in the amino acid sequence represented by $R^1$ in the formula (2) is preferably 4 to 25, and the number of histidine residues in the region of consecutive histidine residues included in $R^1$ is preferably 4 to 8. The number of amino acid residues included in the amino acid sequence represented by r is preferably 10 to 50.

Furthermore, the amino acid sequence represented by r in the formula (2) may contain a TEV domain. When the amino acid sequence represented by r contains the TEV domain, separation of R and $R^2$ is enabled by the cleavage by a TEV protease. The TEV domain is a sequence preferable for obtaining the effects of the present invention, i.e. yielding a large amount of immobilization onto a carrier and increasing the immunoglobulin retention capacity of the carrier. Further, the amino acid sequence represented by r may contain a mutant (mutant) of the TEV domain (having an identity of at least 70%, and preferably at least 90%, with the amino acid sequence of the TEV domain, regardless of whether the mutant can be cleaved by the TEV protease).

The total number of amino acid residues constituting the protein 1 used in the present invention is usually 54 to 800, and in the case of using the protein 1 for the purpose of binding to the particles, the total number of amino acid residues is preferably 80 to 600.

1.2.4. Immunoglobulin Binding Protein 2

The ligand may be an immunoglobulin binding protein having alkali resistance. An immunoglobulin binding protein as another example of the ligand which is preferred as an alkali resistant immunoglobulin binding protein (hereinafter, referred to as "protein 2"), is represented by the following formula (3):

$$R\text{—}R^2 \qquad (3)$$

(wherein R represents an amino acid sequence consisting of 4 to 300 amino acid residues and containing a region of 4 to 20 consecutive histidine residues; and $R^2$ represents an amino acid sequence consisting of 50 to 500 amino acid residues and containing the Z domain, or a fragment or a mutant thereof, the amino acid sequence being capable of binding to an immunoglobulin (wherein the end at which $R^2$ binds to R is the C-terminus or the N-terminus of the immunoglobulin binding domain)).

The number of amino acid residues included in the amino acid sequence represented by R in the formula (3) is preferably 8 to 100, and the number of histidine residues in the region of consecutive histidine residues included in R is preferably 4 to 8. Further, the number of amino acid residues included in the amino acid sequence represented by $R^2$ in the formula (1) is preferably 120 to 480.

Furthermore, in the formula (3), R— is preferably a group represented by the following formula (4):

$$R^1\text{-}r\text{-} \qquad (4)$$

(wherein $R^1$ represents an amino acid sequence consisting of 4 to 100 amino acid residues and containing a region of 4 to 20 consecutive histidine residues (wherein, in $R^1$, an end of the region of consecutive histidine residues is bonded to r); and r represents an arbitrary amino acid sequence consisting of 7 to 200 amino acid residues.)

Furthermore, similarly to the formula (2), the amino acid sequence represented by r in the formula (4) may contain a TEV domain. When the amino acid sequence represented by r contains the TEV domain, separation of R and $R^2$ can be cleaved by a TEV protease. The TEV domain is a sequence preferable for obtaining the effects of the present invention (i.e. yielding a large amount of immobilization onto a carrier and increasing the immunoglobulin retention capacity of the carrier). Further, the amino acid sequence represented by r may contain a mutant of the TEV domain (having an identity of at least 70%, and preferably at least 90%, with the amino acid sequence of the TEV domain, regardless of whether the mutant can be cleaved by the TEV protease).

The number of amino acid residues included in the amino acid sequence represented by $R^1$ in the formula (4) is preferably 4 to 25, and the number of histidine residues included in the region of consecutive histidine residues included in $R^1$ is preferably 4 to 8. The number of amino acid residues included in the amino acid sequence represented by r is preferably 10 to 50.

It is preferable that either or both of the amino acid sequence represented by R and the amino acid sequence represented by $R^2$ in the formula (3) contain a domain t that consists of 1 to 50 amino acid residues and contains one amino acid selected from lysine, arginine, and cysteine. In this case, the amino acid sequence may include plural, the same or different domain t.

When the protein 2 is used as a ligand to the filler for affinity chromatography of the present invention, the protein 2 has high resistance to washing under alkaline conditions (for example, washing using an alkaline liquid of, for example, sodium hydroxide). Some reasons that may be considered include the fact that when a region of consecutive histidine residues is added to the Z domain, the binding position for a porous particle and the Z domain is different from a Z domain without the region of consecutive histidine residues, and the fact that a certain structural change occurs in the Z domain after immobilization, causing an increase in alkali resistance. Although it has not been able to verify the actual reasons by experiments, the results of experiments on alkali resistance indicate that there is operating certain effect obtainable by adding a region of consecutive histidine residues.

Further, in the case of isolating an immunoglobulin by using the filler for affinity chromatography of the present invention, for example, the immunoglobulin can be isolated by preparing the filler for affinity chromatography of the present invention and employing a process of adsorbing the immunoglobulin to the filler (the first process), a process of eluting the immunoglobulin (the second process), and a process of CIP washing the filler with an alkaline liquid (the third process).

In the first process, a solution containing an immunoglobulin is applied in order to flow through, for example, a column packed with the filler for affinity chromatography described above, under the conditions in which the immunoglobulin adsorbs to the ligand of the filler. Herein, the solution containing an immunoglobulin may be any solution containing an immunoglobulin, and examples thereof include a biologically derived specimen such as blood serum, and a supernatant of a hybridoma medium. The conditions in which the immunoglobulin adsorbs include, for example, an immunoglobulin concentration of 0.1 to 10 g/L, a solution pH of 5 to 9, a retention time in the column of 0.5 to 50 minutes, and a temperature of 0° C. to 40° C.

In this first process, most of substances other than the immunoglobulin in the solution pass through the column without being adsorbed. Usually, the filler is washed, in order to remove any substances that are weakly bound, by using a neutral buffer solution containing salts such as NaCl, for example, a sodium dihydrogen phosphate/disodium hydrogen phosphate solution, a citric acid/disodium hydrogen phosphate solution, a hydrochloric acid/tris(hydroxymethyl)aminomethane solution, or a HEPES/sodium hydroxide solution. In the second process, an appropriate buffer solution at pH 2 to 5, for example, a citric acid/sodium citrate solution, an acetic acid/sodium acetate solution, or a hydrochloric acid/glycine solution, is applied in order to elute the immunoglobulin. In the third process, the filler is washed (CIP washing) with an alkaline liquid.

Examples of the alkaline liquid that is used herein include an aqueous solution of sodium hydroxide, an aqueous solution of potassium hydroxide, triethylamine, and tetrabutylammonium hydroxide.

1.2.5. Production of Proteins 1 and 2

As a standard technology for producing the protein 1 and protein 2 that are used in the present invention, these known gene recombination technologies described in, for example, Frederick M. Ausbel, et al., Current Protocols in Molecular Biology; and Sambrook, et al. ed., Molecular Cloning (Cold Spring Harbor Laboratory Press, 3$^{rd}$ edition, 2001). For example, the protein 1 or 2 used in the present invention can be produced by using the gene recombination technology described in U.S. Pat. No. 5,151,350. Specifically, an expression vector in which a nucleic acid sequence that encodes a target modified protein (protein 1 or 2) has been incorporated is used to transform a host such as Escherichia coli, and the cells are cultured in an appropriate liquid medium. Thereby, a large amount of the protein 1 or 2 that is used in the present invention can be economically acquired from the cultured cells. Any of the expression vectors that are already known to be capable of replication in bacterial cells can be used, and examples thereof include the plasmid described in U.S. Pat. No. 5,151,350, and the plasmids described in Sambrook, et al. ed., Molecular Cloning (Cold Spring Harbor Laboratory Press, 3$^{rd}$ edition, 2001). Furthermore, in order to transform a host by introducing a nucleic acid into the host, any method that is known to those skilled in the art may be used, and for example, the known methods described in Sambrook, et al. ed., Molecular Cloning (Cold Spring Harbor Laboratory Press, 3$^{rd}$ edition, 2001) can be used. Methods for culturing transformed bacterial cells and collecting an expressed protein, are well known to those skilled in the art.

Specifically, an intended expression vector can be obtained by synthesizing a DNA that encodes a desired amino acid sequence as separately synthesized oligonucleotides each consisting of several tens of bases, binding these separated oligonucleotides by a ligation reaction using a DNA ligase, and inserting the resultant into a plasmid. At that time, employing a nucleic acid sequence which uses optimum codons of Escherichia coli for the purpose of efficiently expressing the protein in Escherichia coli, is a method that is generally implemented by those skilled in the art. It is also possible to construct a DNA sequence that encodes a desired amino acid sequence from the genomic DNA of Straphylococcus aureus by using the PCR (Polymerase Chain Reaction) technology, as illustrated in the Examples of the present invention described below.

For example, the nucleic acid used in the production method described above can encode an immunoglobulin binding protein (protein 1 or 2) or functional mutant thereof. According to the present invention, the term "functional mutant (equifunctional mutant)" of an immunoglobulin binding protein refers to an immunoglobulin binding protein that has been modified by, for example, partial addition, deletion or substitution of amino acids, chemical modification of amino acid residues, and it is implied that the functional mutant retains an identity of at least 70%, and preferably at least 90%, with the amino acid sequence of the immunoglobulin binding protein prior to modification, and can be considered to have an immunoglobulin binding activity that is equal to that of the immunoglobulin binding protein prior to modification. That is, the aforementioned nucleic acid includes nucleic acids that encode the protein 1 or protein 2 according to the present specification.

Furthermore, as discussed above, the protein 1 and protein 2 used in the present invention may be proteins containing one or more (preferably 2 to 12, and more preferably 4 to 10) immunoglobulin binding domains. A cDNA that encodes such a protein can be easily produced by tandemly linking a predetermined number of cDNA's (complementary DNA's) encoding one immunoglobulin binding domain. When a cDNA thus produced is inserted into an appropriate expression plasmid and used, a protein containing one or more immunoglobulin binding domains can be easily produced.

For example, as described below in the Examples, a protein having the amino acid sequence of SEQ ID NO: 4 (SPATK), a protein having the amino acid sequence of SEQ ID NO: 2 (SP4Z), or a protein which has an amino acid sequence obtained by deletion, substitution or addition of one or several amino acids with respect to SEQ ID NO: 2 or SEQ ID NO: 4, as well as having immunoglobulin activity, is suitable as the immunoglobulin binding protein to be used in the present invention.

1.2.6. Binding of Ligand

The method for binding the ligand to the carrier is preferably the method of using epoxy group contained in the porous particle itself as a ligand binding site. In addition to that, a method of activating alcoholic hydroxyl group produced by ring-opening of the epoxy group contained in the porous particles, by using, for example, tosyl group, and binding the ligand to the porous particle; or a method of further extending a linker from the epoxy group contained in the porous particles or from a group that is produced by ring-opening the epoxy group, and then binding the ligand to the porous particles via the linker, may also be used.

The conditions for ligand binding may vary depending on the epoxy group content of the porous particles prior to ligand binding and the type of the ligand, and a method that is well known to those skilled in the art can be employed. When the ligand is a protein, an amino group at the N-terminus of the protein, or a lysine or a cysteine residue contained in the protein can be used as a reaction point with the epoxy group. In the case of binding a protein, for example, an aqueous solution of a buffer having an isoelectric point close to that of the protein is used, a salt such as sodium chloride and sodium sulfate is added as necessary, the protein and porous particles are allowed to react while mixed for 1 to 24 hours at 0° C. to 40° C., and thereby the protein as a ligand can be bound.

The amount of ligand binding is appropriately adjusted by, for example, the type of the ligand, the type of the target molecule. However, when an antibody binding protein such as Protein A is used for binding as a ligand, the amount of ligand binding is preferably 10 mg to 200 mg, and more preferably 25 mg to 100 mg, per gram of the porous particles. When an antibody binding protein such as Protein A is used for binding as a ligand, if the amount of ligand binding per gram of the porous particles is 10 mg or more, the dynamic binding capacity is excellent, while if the amount of ligand binding is 200 mg or less, a large amount of eluent needed for the elution of the bound antibody becomes an appropriate amount.

1.2.7. Ring-Opened Epoxy Group

The porous particle that constitutes the filler for affinity chromatography of the present invention has ring-opened epoxy group. This ring-opened epoxy group may be obtained by binding a ligand to the porous particles formed of a particular polymer as described above, and then ring-opening of epoxy group contained in the polymer, that is, residual epoxy groups other than the epoxy groups bound to the ligand. This implies that substantially all of the epoxy groups at the surfaces of the porous particle are ring-opened before the porous particles are used as a filler for affinity chromatography.

Further, when substantially all of the epoxy groups at the surfaces of the porous particles are ring-opened, it is implied that the content of the epoxy groups remaining on the porous particles having ring-opened epoxy groups is preferably less than 0.04 mmol/g, and more preferably less than 0.02 mmol/g. It is most preferable that no epoxy groups be remaining. If the residual amount of the ring-opened epoxy groups is less than 0.04 mmol/g, preferable storage stability is obtained.

The alcoholic hydroxyl group which is produced by ring-opening of an epoxy group, hydrophilizes the surfaces of the particles, prevents, for example, non-specific adsorption of proteins, and also improves the toughness of the particles in water, thereby preventing destruction of the particles at a high flow rate. The method of ring-opening of the epoxy groups in the porous particles may be, for example, a method of stirring under heating or at room temperature in water solvent in the presence of acid or alkali. Furthermore, an epoxy group may also be ring-opened by using a blocking agent having a mercapto group, such as mercaptoethanol or thioglycerol, or a blocking agent having an amino group such as monoethanolamine. The most preferred ring-opened epoxy group is a ring-opened epoxy group obtainable by ring-opening an epoxy group contained in the porous particles by using thioglycerol. Thioglycerol is less toxic than, for example, mercaptoethanol as a raw material, and a ring-opened epoxy group to which thioglycerol is added has an advantage of exhibiting less non-specific adsorption than a ring-opened group obtained by using a blocking agent having an amino group, and having a higher dynamic binding capacity.

1.2.8. Particle Size, Pore Volume

The particle size of the porous particle that constitute the filler for affinity chromatography of the present invention is usually 35 μm to 100 μm, and preferably 38 μm to 75 μm. When the particle size is 35 μm or more, excellent pressure characteristics are obtained. When the particle size is 100 μm or less, a filler with a high dynamic binding capacity is obtained. The particle size of the porous particles having ring-opened epoxy groups can be adjusted by means of the conditions for performing polymerization of the porous particles, as described above. Further, the "particle size" according to the present invention refers to the volume average particle size obtainable by using a laser diffraction scattering type particle size distribution analyzer.

The porous particle having ring-opened epoxy groups, which constitute the filler for affinity chromatography of the present invention, preferably has a pore volume of 1.00 ml/g to 3.00 ml/g, and more preferably 1.05 ml/g to 2.10 ml/g, when pores corresponding to a pore diameter in the range of 10 nm to 5,000 nm are measured with a mercury porosimeter. When the pore volume is within the range described above, a filler having a high dynamic binding capacity for proteins is obtained.

The porous particle having ring-opened epoxy groups, which constitute the filler for affinity chromatography of the present invention, preferably has a specific surface area of 80 $m^2/g$ to 150 $m^2/g$, and more preferably 100 $m^2/g$ to 140 $m^2/g$. Here, if the specific surface area is less than 80 $m^2/g$, a poor dynamic binding capacity is obtained. On the other hand, if the specific surface area is greater than 150 $m^2/g$, the strength of the filler is poor so that the filler may be destroyed at a high flow rate, and the column pressure may increase. The term "specific surface area" according to the present invention means a value obtained by dividing the surface area of pores having a pore diameter of 10 nm to 5,000 nm obtainable with a mercury porosimeter, by the dry weight of the particles.

The porous particle having ring-opened epoxy groups, which constitute the filler for affinity chromatography of the present invention, preferably has a volume average pore diameter of 55 nm to 300 nm, and more preferably 60 nm to 250 nm. Here, if the volume average pore diameter is less than 55 nm, a significant decrease in the dynamic binding capacity at a high flow rate may be observed. On the other hand, if the volume average pore diameter is greater than 300 nm, the dynamic binding capacity may decrease irrespective of the flow rate. The term "volume average pore diameter" according to the present invention refers to the volume average pore diameter of pores having a pore diameter of 10 nm to 5,000 nm obtainable by using a mercury porosimeter.

EXAMPLES

2. Examples

Hereinafter, the filler for affinity chromatography of the present invention will be more specifically described by way of Examples. Furthermore, the following descriptions generally illustrate embodiments of the present invention, and the present invention is not intended to be limited by such descriptions without any particular reasons.

2.1. Evaluation Methods

2.1.1. Epoxy Group Content

The epoxy group content of the porous particles prior to ligand binding was quantitatively determined by measuring the mass of an aqueous dispersion of porous particles in a polyethylene bottle, the aqueous dispersion of porous particles having a mass concentration that is accurately known at around 10% such that the molar number of epoxy groups calculated from the amount of epoxy group-containing monomer used in the polymerization is 2.00 mmol; adding thereto 25 mL of an aqueous solution of calcium chloride at a concentration of 38% and 2.00 mL of 2 Normal hydrochloric acid; ring-opening the epoxy groups by stirring the mixture for 2 hours and 30 minutes at 75° C.; cooling the mixture; subsequently neutralizing the mixture with 2.50 mL of a 2 Normal aqueous solution of sodium hydroxide; and back-titrating the neutralization product with 0.1 Normal hydrochloric acid while monitoring the pH with a pH meter.

2.1.2. Particle Size (Volume Average Particle Size)

The volume average particle size of the particles was measured using a laser diffraction scattering type particle size distribution analyzer (LS13320 manufactured by Beckman Coulter, Inc.).

2.1.3. Pore Volume, Specific Surface Area, and Volume Average Pore Diameter

Dried particles were obtained by vacuum drying the particles at 40° C. for 24 hours, and the pore volume, specific surface area, and volume average pore diameter (pore diameter) of the dried particles were determined with a mercury porosimeter (Autopore IV9520 manufactured by Shimadzu Corp.). The measurement range was set to 10 nm to 5,000 nm in terms of the pore diameter range.

2.1.4. Alkali Resistance

A filler containing the porous particles thus obtained and a ligand bound thereto was packed in a 1-mL (5 mmϕ×50 mm in length) column, and the column was connected to AKTAprime plus manufactured by GE Healthcare Biosciences Corp. The column was washed bypassing 20 mL of a 20 mM phosphate buffer (pH 7.5) to flow through, and then while a 75 mM glycine hydrochloride buffer (pH 3.2) was allowed to flow at a flow rate of 0.2 mL/minute, the volume of liquid flow to reach pH 6.5 was measured. This was designated as the initial amount of liquid flow for neutralization. Subsequently, the interior of the column was purged with a 0.3 Normal aqueous solution of sodium hydroxide, and then the column was left to stand for 15 hours at 25° C. The column was washed in the same manner as described above, and the amount of liquid flow for neutralization was measured and designated as the amount of liquid flow for neutralization after alkali deterioration. The liquid volume difference between the initial amount of liquid flow for neutralization and the amount of liquid flow for neutralization after alkali deterioration (indicated in Table 2 to Table 4 as "liquid volume difference") was used as an index for alkali resistance. That is, it can be said that as the liquid volume difference between the initial amount of liquid flow for neutralization and the amount of liquid flow for neutralization after alkali resistance is smaller, less alkali deterioration occurs, and alkali resistance is excellent.

2.1.5. Dynamic Binding Capacity for Protein

The dynamic binding capacity for a protein (human IgG antibody) was measured at a linear flow rate of 300 cm/hour by using AKTAprime plus manufactured by GE Healthcare Biosciences Corp. The column capacity was 4 mL (5 mmϕ× 200 mm in length), and the human IgG antibody (HGG-1000 manufactured by Equitech Bio, Inc.) used was diluted to 5 mg/ml with a 20 mM phosphate buffer (pH 7.5). The dynamic binding capacity (indicated as "DBC" in Table 2 to Table 4) was determined from the amount of human IgG antibody adsorption and the column packing volume at an elution peak of 10% breakthrough. Hereinafter, the dynamic binding capacity may be referred to as DBC.

2.1.6. Storage Stability

The column for which the initial DBC had been measured was stored, without any further change, for 3 weeks at 40° C., and the DBC of this column after storage was measured in the same manner. The proportion (maintenance ratio) of the DBC after storage relative to the initial DBC was expressed in percentage (%), and this proportion was used as an index for storage stability.

2.1.7. Binding Amount of Protein A

The binding amount of protein A (SPA) as a ligand bound to the porous particles was quantitatively determined by using a reagent kit which used a bicinchoninic acid (BCA) reagent. Specifically, 1 mg of a filler in terms of the solids content was collected in a test tube, and this was quantitatively determined by using a BCA Protein Assay Kit manufactured by Thermo Fisher Scientific, Inc. (formerly, PIERCE Corp.). The reaction was carried out by inversion mixing for 30 minutes at 37° C. The calibration curve was established by using samples of the same lot as the protein A bound to the porous particles.

2.2. Experimental Example

2.2.1. Example 1

(i) Suspension Polymerization of Porous Particles 8.50 g of polyvinyl alcohol (PVA-217 manufactured by Kuraray Co., Ltd.), 0.43 g of sodium dodecyl sulfate (EMAL 10G, manufactured by Kao Corp.), and 21.3 g of sodium sulfate were added to 4251 g of pure water. The mixture was stirred overnight, and thus an aqueous solution (S-1) was prepared. On the day of performing polymerization, 20 g of the solution (S-1) was isolated and set aside.

Next, 82.4 g of (M-1) glycerol monomethacrylate (manufactured by NOF Corp.), 16.5 g of (M-2) glycidyl methacrylate (manufactured by Mitsubishi Rayon Co., Ltd.), and 65.9 g of (M-3) trimethylolpropane trimethacrylate (manufactured by Sartomer USA LLC.) were dissolved in 246 g of 2-octanone (manufactured by Toyo Gosei Co., Ltd.) and 61.7 g of acetophenone (manufactured by Wako Pure Chemical Industries, Ltd.), and thus a monomer solution was prepared. Further, the numbers of parts of the respective monomers relative to 100 parts by mass of the total mass of the monomers were 80 parts by mass of glycerol monomethacrylate, 10 parts by mass of glycidyl methacrylate, and 40 parts by mass of trimethylolpropane trimethacrylate.

2.0 g of 2,2'-azoisobutyronitrile (manufactured by Wako Pure Chemical Industries, Ltd.) was added and dispersed in 20 g of the isolated solution (S-1), and thus an initiator dispersion liquid was prepared.

Subsequently, the aqueous solution (S-1) and the monomer solution thus prepared were fed into a 7-L baffled separable flask, and the separable flask was equipped with a thermometer, a stirring blade and a cooling tube, and was placed in a hot water bath. Stirring was initiated at 240 rpm under a nitrogen atmosphere. Subsequently, the separable flask was heated by means of the hot water bath, and when the internal temperature reached 85° C., the initiator dispersion liquid was added thereto. While the temperature was maintained at 85° C., the mixture was stirred for 5 hours.

Next, the reaction liquid was cooled, subsequently the reaction liquid thus obtained was filtered through a Nutsche filter, and the filter cake was washed with pure water and isopropyl alcohol. The washed particles were transferred into a plastic bottle and dispersed in water, and decantation was carried out three times to remove fine particles. Porous particles 1 (dry mass of particles: 105 g) dispersed in water at 12.5 mass % through the operation described above were obtained. The epoxy group content of the porous particles 1 was 0.55 mmol/g.

(ii) Production of Ligand 2.2.1.1. Construction of SP4Z Expression Vector

An immunoglobulin binding protein (SP4Z) expression vector was constructed by the following steps. FIG. 2 is a diagram illustrating the method for constructing an SP4Z vector.

(1) Step 1

A DNA encoding a monomeric Z domain was used as a starting material, and thus a monomeric Z domain vector (A-pETM11) (SP1Z) having an NcoI cleavage site and an EcoRI cleavage site was constructed.

(2) Step 2

Next, one more Z domain was added to the A-pETM11 vector, and thus a dimeric Z domain vector (AB-pETM11) (SP2Z) having an EcoRI cleavage site and a SacI cleavage site was constructed.

(3) Step 3

Next, still one more Z domain was added to the AB-pETM11 vector, and thus a trimeric Z domain vector (ABC-pETM11) (SP3Z) having a SacI cleavage site and a HindIII cleavage site was constructed.

(4) Step 4

Finally, a fourth Z domain was added to the ABC-pETM11 vector, and thus a pETM11-SP4Z vector having a HindIII cleavage site and an XhoI cleavage site was constructed.

2.2.1.2. Construction of SP1Z-pETM11 Vector (Monomeric Z Domain Vector Having Stop Codon) (Step 1 of FIG. 2)

PCR was carried out by using SPZK DNA (SEQ ID NO: 3) as a template, and by using Primer 153 (SEQ ID NO: 5) as a forward primer and Primer 156 (SEQ ID NO: 8) as a reverse primer. The Primer 153 and Primer 156 respectively include an NcoI cleavage site and a SacI restriction enzyme cleavage site. The PCR conditions were as follows.

Stage 1: One cycle, for 1 minute at 94° C.; stage 2: for 30 seconds at 94° C., for 30 seconds at 55° C., and for 2.5 minutes at 72° C. (25 cycles); stage 3: one cycle, for 10 minutes at 72° C., and then the reaction system was maintained at 4° C.

The PCR product was purified with a production kit manufactured by GE Healthcare Biosciences Corp. Subsequently, ligation of the PCR product to a pETM11 vector that had been cleaved by using NcoI restriction enzyme and SacI restriction enzyme, was carried out. The digestion reactions using the restriction enzymes were carried out for one hour at 37° C. by using NcoI restriction enzyme and SacI restriction enzyme, both manufactured by New England Biolabs, Inc., and the reaction product was purified by PCR with a production kit manufactured by GE Healthcare Biosciences Corp.

The ligation reaction was carried out overnight at room temperature by using T4 DNA ligase (manufactured by Invitrogen, Inc.). The vector obtained by the ligation was used to transform DH5a competent cells (manufactured by Biomedal Life Science S.L.), and the transformant thus obtained was cultured overnight at 37° C. in LB medium containing kanamycin. A plasmid was extracted from positive colonies, and it was verified by using 3730 DNA Sequencer (manufactured by Applied Biosystems, Inc.) that the sequence of the inserted DNA fragment was correct.

2.2.1.3. Construction of A-pETM11 Vector (Monomeric Z Domain Vector without Stop Codon)

A-pETM11 vector was constructed in the same manner as in Experiment 2.2.1.2., by using Primer 153 as a forward primer and Primer 154 (SEQ ID NO: 6) as a reverse primer, instead of Primers 153 and 156. Further, the insertion of the DNA fragment was carried out by utilizing the NcoI cleavage site and the EcoRI cleavage site of pETM11.

2.2.1.4. Construction of SP2Z-pETM11 Vector (Dimeric Z Domain Vector Having Stop Codon)

A DNA of a monomeric Z domain having an EcoRI cleavage site and a SacI cleavage site was prepared by PCR by using Primer 155 (SEQ ID NO: 7) as a forward primer and Primer 156 as a reverse primer, and the DNA was inserted into the EcoRI cleavage site and the SacI cleavage site of A-pETM11. Thus, an SP2Z-pETM11 vector was constructed. The experiment was carried out under the same conditions as in Experiment 2.2.1.2.

2.2.1.5. Construction of AB-pETM11 Vector (Dimeric Z Domain Vector Without Stop Codon)

A DNA of a monomeric Z domain having an EcoRI cleavage site and a SacI cleavage site without any stop codon, was prepared by PCR by using Primer 155 as a forward primer and Primer 157 (SEQ ID NO: 9) as a reverse primer, and the DNA was inserted into the EcoRI cleavage site and the SacI cleavage site of A-pETM11. Thus, an AB-pETM11 vector was constructed. The experiment was carried out under the same conditions as in Experiment 2.2.1.2.

2.2.1.6. Construction of SP3Z-pETM11 Vector (Trimeric Z Domain Vector Having Stop Codon)

A DNA of a monomeric Z domain having a SacI cleavage site and a XhoI cleavage site was prepared by PCR by using Primer 158 (SEQ ID NO: 10) as a forward primer and Primer 161 (SEQ ID NO: 13) as a reverse primer, and the DNA was inserted into the EcoRI cleavage site and the SacI cleavage site of AB-pETM11. Thus, an SP3Z-pETM11 vector was constructed. The experiment was carried out under the same conditions as in Experiment 2.2.1.2.

2.2.1.7. Construction of ABC-pETM11 Vector (Trimeric Z Domain Vector without Stop Codon)

A DNA of a monomeric Z domain having a SacI cleavage site and a HindIII cleavage site without any stop codon, was prepared by PCR by using Primer 158 as a forward primer and Primer 159 (SEQ ID NO: 11) as a reverse primer, and the DNA was inserted into the SacI cleavage site and the HindIII cleavage site of AB-pETM11. Thus, an ABC-pETM11 vector was constructed. The experiment was carried out under the same conditions as in Experiment 2.2.1.2.

2.2.1.8. Construction of SP4Z-pETM11 Vector (Tetrameric Z Domain Vector Having Stop Codon)

A DNA of a monomeric Z domain having a HindIII cleavage site and a XhoI cleavage site was prepared by PCR by using Primer 160 (SEQ ID NO: 12) and Primer 161, and the DNA was inserted into the HindIII cleavage site and the XhoI cleavage site of ABC-pETM11. Thus, an SP4Z-pETM11 vector was constructed. The experiment was carried out under the same conditions as in Experiment 2.2.1.2.

2.2.1.9. Expression and Purification of SP4Z

The SP4Z-pETM11 vector thus obtained was introduced into E. coli (strain BL21) cells (manufactured by Stratagene Corp.), 1 mM IPTG (manufactured by Sigma-Aldrich Company) was added thereto at 18° C., and the cells were incubated for 15 hours. Thus, a recombinant immunoglobulin binding protein (SP4Z) was expressed. Prior to induction, the cells were incubated at 37° C. until the absorbance (OD600) reached about 0.6. After the protein was expressed, the cells were collected and crushed in a Tris buffer solution at pH 8.0.

The recombinant immunoglobulin binding protein (SP4Z) thus obtained was purified by Ni affinity chromatography (Ni-NTA (nitrilotriacetic acid) particles, manufactured by Qiagen N.V.). The purified immunoglobulin binding protein was further purified by anion exchange chromatography (Q-Sepharose FF, manufactured by GE Healthcare Biosciences Corp.). The purity of the immunoglobulin binding protein checked by SDS-PAGE was 960.

Furthermore, it was confirmed by MALDI-TOF mass spectrum analysis that the recombinant immunoglobulin binding protein (SP4Z) thus obtained had the amino acid sequence presented in FIG. 1 (SEQ ID NO: 2), based on the sequence match of the respective amino acid sequences.

Further, in FIG. 1, R and $R^2$ respectively correspond to R and $R^2$ in the formulas (1) and (3), and $R^1$ and r respectively correspond to $R^1$ and r in the formulas (2) and (4). The underlined part in r represents the TEV domain (TEV protease (peptide bond hydrolysis synthetase) cleavage site).

(iii) Binding of Porous Particles and Ligand

A liquid mixture in which 1 g in terms of dry particle mass of the porous particle 1 and 0.1 g of SP4Z were dispersed in 25 mL of 0.1 M phosphate buffer (pH 6.8) was prepared, and the liquid mixture was subjected to inversion mixing for 24 hours at 10° C. to allow SP4Z (ligand) to bind to the porous particles 1. The particles thus produced were filtered, subsequently mixed with 25 mL of 1 M thioglycerol, and allowed to react for 4 hours at 30° C., and thereby the remaining epoxy groups were ring-opened. The particles were washed with PBS/0.5% Tween20, followed by PBS, and thus, a filler for affinity chromatography 1 (A-1) formed from ligand-bound porous particles having ring-opened epoxy groups was obtained. A quantitative measurement was carried out using a Thermo Scientific Pierce BCA Protein Assay kit, and the amount of SP4Z bound to the particles was found to be 84 mg/g of particle.

(iv) Evaluation

The particle size of (A-1) was 58 μm, the pore volume was 1.22 mL/g, the specific surface area was 111 m²/g, and the volume average pore diameter was 74 nm. The liquid volume difference due to alkali deterioration was 0.32 mL, the dynamic binding capacity for protein (human IgG antibody) was 43 mg/mL, the dynamic binding capacity for protein (human IgG antibody) after a storage test was 44 mg/mL, and the DBC retention was 102%.

2.2.2. Example 2

(i) Production of Ligand

An immunoglobulin binding protein having the amino acid sequence presented in FIG. 3 (SPATK (SEQ ID NO: 4)) was prepared by Preparation Examples (1) to (5) that will be described below.

(1) Step 1

A DNA encoding a D-A domain was obtained by PCR by using the genomic DNA of Staphylococus aureus as a template, and by using a primer having a restriction enzyme NcoI site (Primer 11) and a primer having restriction enzyme BamHI and HindIII sites (Primer 12). This DNA was cleaved with restriction enzymes NcoI and HindIII, and was ligated to a pETM11 that had been cleaved with the same restriction enzymes NcoI and HindIII. Thus, a SPAK plasmid was constructed.

(2) Step 2

Next, a DNA encoding a new D-A domain was obtained by PCR by using the SPAK plasmid obtained as described above as a template, and by using a primer having a restriction enzyme BamHI site (Primer 13) and a primer having a restriction enzyme HindIII site (Primer 14). This DNA was cleaved with restriction enzymes BamHI and HindIII, and was ligated to the SPAK obtained as described above, which had been cleaved with the same restriction enzymes BamHI and HindIII. Thus, a SPATK plasmid was constructed.

(3) Construction of SPAK Plasmid

PCR was carried out by using the genomic DNA of Staphylococus aureus as a template and using Primer 11 and Primer 12. The PCR conditions were as follows.

Stage 1: One cycle, for 1 minute at 94° C.; stage 2: for 30 seconds at 94° C., for 30 seconds at 53° C., and for 2.5 minutes at 72° C. (25 cycles); stage 3: one cycle, for 10 minutes at 72° C., and then the reaction system was maintained at 4° C.

The PCR product was purified with a purification kit manufactured by GE Healthcare Biosciences Corp. Subsequently, the PCR product was cleaved by using NcoI restriction enzyme and HindIII restriction enzyme. The PCR product was cleaved with NcoI restriction enzyme and HindIII restriction enzyme in the same manner as in the case of the pETM11 vector. The digestion reactions using the restriction enzymes were carried out by using NcoI restriction enzyme and HindIII restriction enzyme, both manufactured by New England Biolabs, Inc., and the reaction product was purified with a purification kit manufactured by GE Healthcare Biosciences Corp. The ligation reaction was carried out overnight at room temperature by using T4 DNA ligase (manufactured by Invitrogen, Inc.). The vector obtained by the ligation was used to transform DH5a competent cells (manufactured by Biomedal Life Science S.L.). It was verified by using 3730 DNA Sequencer (manufactured by Applied Biosystems, Inc.) that the sequence of the plasmid of positive colonies (SPAK plasmid) was correct.

(4) Construction of SPATK Plasmid

A DNA encoding a new D-A domain was obtained by PCR by using the SPAK plasmid as a template, and by using Primer 13 and Primer 14. The PCR conditions were as follows: Stage 1: One cycle, for 1 minute at 94° C.; stage 2: for 30 seconds at 94° C., for 30 seconds at 55° C., and for 2.5 minutes at 72° C. (25 cycles); stage 3: one cycle, for 10 minutes at 72° C., and then the reaction system was maintained at 4° C. The PCR product was purified with a purification kit manufactured by GE Healthcare Biosciences Corp. Subsequently, this DNA was cleaved by using BamHI restriction enzyme and HindiIII restriction enzyme. The SPAK plasmid was also cleaved in the same manner by using BamHI restriction enzyme and HindIII restriction enzyme. The digestion reactions using the restriction enzymes were carried out by using BamHI restriction enzyme and HindIII restriction enzyme, both manufactured by New England Biolabs, Inc., and the reaction product was purified with a purification kit manufactured by GE Healthcare Biosciences Corp. The ligation reaction was carried out overnight at room temperature by using T4 DNA ligase (manufactured by Invitrogen, Inc.). The vector obtained by the ligation was used to transform DH5a competent cells (manufactured by Biomedal Life Science S.L.). It was verified by using 3730 DNA Sequencer (manufactured by Applied Biosystems, Inc.) that the sequence of the plasmid of positive colonies (SPATK plasmid) was correct.

(5) Expression and Purification of SPATK

The SPATK plasmid thus obtained was used to transform *E. coli* (strain BL21) cells (manufactured by Stratagene, Inc.). 1 mM IPTG (manufactured by Sigma-Aldrich Company) was added thereto at 18° C., and the cells were incubated for 15 hours. Thus, a recombinant immunoglobulin binding protein (SPATK) was expressed. Prior to induction, the cells were incubated at 37° C. until the absorbance (OD600) reached about 0.6. After the protein was expressed, the cells were collected and crushed in a Tris buffer solution at pH 8.0.

The recombinant immunoglobulin binding protein (SPATK) thus obtained was purified by Ni affinity chromatography (Ni-NTA (nitrilotriacetic acid) particles, manufactured by Qiagen N.V.). The purified immunoglobulin binding protein was further purified by anion exchange chromatography (Q-Sepharose FF, manufactured by GE Healthcare Biosciences Corp.). The purity of the immunoglobulin binding protein checked by SDS-PAGE was 96%.

Figure 3:
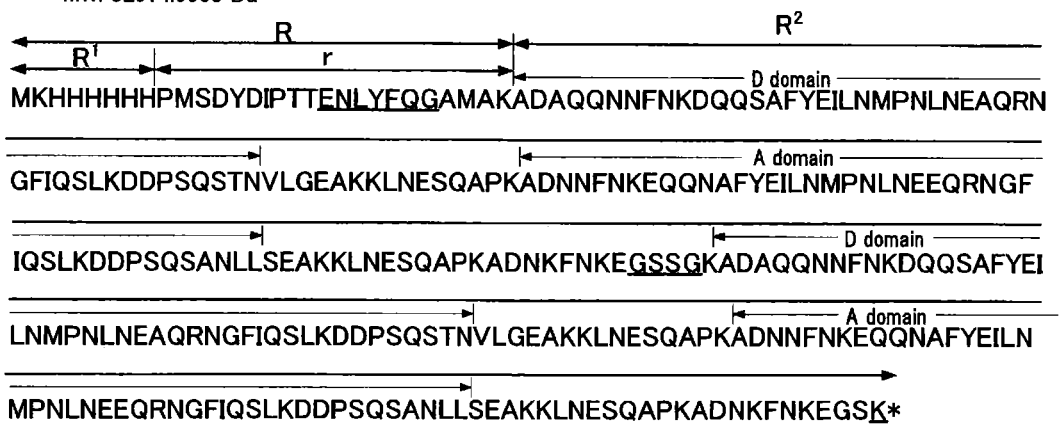
FIG. 3 is a diagram illustrating the amino acid sequence of the immunoglobulin binding protein (SPATK) prepared in Example 2 of the present invention.
Figure 4:
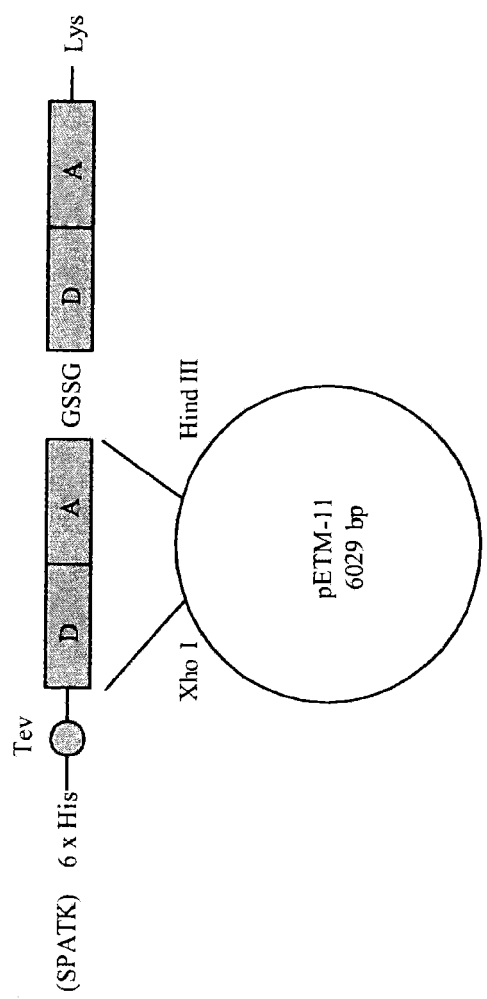
FIG. 4 is a diagram explaining the configuration of a DNA fragment that encodes the immunoglobulin binding protein related to Example 2 of the present invention and is inserted into an expression vector (pETM-11).

Furthermore, it was confirmed by MALDI-TOF mass spectrum analysis that the recombinant immunoglobulin binding protein (SPATK) thus obtained had the amino acid sequence presented in FIG. 3, based on the sequence match of the respective amino acid sequences.

tive monomers were set as indicated in Table 2, and thus, fillers for affinity chromatography 1 and 2 (B-1 and B-2) formed from the ligand-bound porous particles 2 having ring-opened epoxy groups were obtained and evaluated. The results are presented in Table 2.

2.2.4. Example 3

8.52 g of polyvinyl alcohol (PVA-217 manufactured by Kuraray Co., Ltd.), 2.13 g of sodium dodecyl sulfate (EMAL 10G, manufactured by Kao Corp.), and 4.26 g of sodium carbonate were added to 4091 g of pure water. The mixture was stirred overnight, and thus an aqueous solution (S-2-1) was prepared. Furthermore, on the day of performing polymerization, 30 g of the solution (S-2-1) was isolated and set aside, and 2.13 g of sodium nitrite was dissolved in the remaining of (S-2-1) to prepare an aqueous solution (S-2-2).

Subsequently, 35.9 g of glycerol methacrylate (manufactured by NOF Corp.), 125 g of glycerin dimethacrylate (manufactured by Shin Nakamura Chemical Co., Ltd.), and 17.9 g of glycidyl methacrylate (manufactured by Mitsubishi Rayon Co., Ltd.) were dissolved in 86.4 g of 2-octanone (manufactured by Toyo Gosei Co., Ltd.) and 253 g of acetophenone (manufactured by Wako Pure Chemical Industries, Ltd.), and thus a monomer solution was prepared. Further, the numbers of parts of the respective monomers relative to 100 parts by mass of the total mass of the monomers were 20 parts by mass of glycerol methacrylate, 70 parts by mass of glycerin dimethacrylate, and 10 parts by mass of glycidyl methacrylate.

TABLE 1

| Primer name | Sequence |
|---|---|
| Primer11 | 5'- CAT GCC ATG GCG AAA GCT GAT GCG CAA CAA AAT |
| Primer12 | 5'- CCC AAG CTT TTA CTT GGA TCC TTC TTT GTT GAA TTT GTT ATC CG |
| Primer13 | 5'- CGG GGA TCC TCA GGC AAA GCT GAT GCG CAA CAA AAT |
| Primer14 | 5'- CCC AAG CTT TTA CTT CGA CCC TTC TTT GTT GAA TTT GTT ATC CG |

(ii) Binding of Porous Particles and Ligand

The processes were carried out in the same manner as in Example 1, except that SPATK was used instead of SP4Z as a ligand, and the porous particles 1 obtained in Example 1 were used. Thus, a filler for affinity chromatography 2 (A-2) formed from ligand-bound porous particles having ring-opened epoxy groups was obtained. The amount of SPATK bound to the particles was 83 mg/g of particles. The results are presented in Table 2.

The particle size of (A-2) was 58 the pore volume was 1.23 mL/g, the specific surface area was 112 m²/g, and the volume average pore diameter was 76 nm. The liquid volume difference due to alkali deterioration was 0.33 mL, the dynamic binding capacity for protein (human IgG antibody) was 44 mg/mL, the dynamic binding capacity for protein (human IgG antibody) after a storage test was 32 mg/mL, and the DBC retention was 74%.

2.2.3. Comparative Examples 1 and 2

The processes were carried out in the same manner as in Examples 1 and 2, except that the numbers of parts of respec- 2.2 g of 2,2'-azoisobutyronitrile (manufactured by Wako Pure Chemical Industries, Ltd.) was added to and dispersed in 30 g of (S-2-1), and thus, an initiator dispersion liquid was obtained.

Subsequently, the aqueous solution (S-2-2) and the monomer solution thus prepared were introduced into a 7-L baffled separable flask, and the separable flask was equipped with a thermometer, a stirring blade and a cooling tube, and was placed in a hot water bath. Stirring was initiated at 220 rpm under a nitrogen atmosphere. Subsequently, the separable flask was heated by means of the hot water bath, and when the internal temperature reached 85° C., the initiator dispersion liquid was added thereto. While the temperature was maintained at 85° C., the mixture was stirred for 5 hours.

Next, the reaction liquid was cooled, subsequently the reaction liquid thus obtained was filtered through a Nutsche filter, and the filter cake was washed with pure water and isopropyl alcohol. The washed particles were transferred into a plastic bottle and dispersed in water, and decantation was carried out three times to remove fine particles. Porous particles 3 (dry mass of particles: 123 g) dispersed in water at 12.5 mass % through the operation described above were obtained. The epoxy group content of the porous particles 3 was 0.47 mmol/g.

The processes were carried out in the same manner as in Example 1, except that the porous particles 3 were used instead of the porous particles 1, and thus a filler for affinity chromatography 3 (A-3) formed from the ligand-bound porous particles 3 having ring-opened epoxy groups, were obtained. The results are presented in Table 3.

2.2.5. Example 4

0.600 g of polyvinyl alcohol (PVA-217 manufactured by Kuraray Co., Ltd.), 0.030 g of sodium dodecyl sulfate (EMAL 10G, manufactured by Kao Corp.), and 1.50 g of sodium sulfate were added to 300 g of pure water. The mixture was stirred overnight, and thus an aqueous solution (S-3-1) was prepared. Furthermore, on the day of performing polymerization, 5 g of the solution (S-3-1) was isolated and set aside, and 0.150 g of sodium nitrite was dissolved in the remaining of (S-3-1) to prepare an aqueous solution (S-3-2).

Subsequently, 8.19 g of glycerin dimethacrylate (manufactured by Shin Nakamura Chemical Co., Ltd.) and 3.51 g of glycidyl methacrylate (manufactured by Mitsubishi Rayon Co., Ltd.) were dissolved in 6.25 g of 2-octanone (manufactured by Toyo Gosei Co., Ltd.) and 18.3 g of acetophenone (manufactured by Wako Pure Chemical Industries, Ltd.), and thus a monomer solution was prepared. Further, the numbers of parts of the respective monomers relative to 100 parts by mass of the total mass of the monomers were 70 parts by mass of glycerin dimethacrylate and 30 parts by mass of glycidyl methacrylate.

0.149 g of 2,2'-azoisobutyronitrile (manufactured by Wako Pure Chemical Industries, Ltd.) was added to and dispersed in 5 g of (S-3-1), and thus, an initiator dispersion liquid was obtained.

Subsequently, the aqueous solution (S-3-2) and the monomer solution thus obtained were introduced into a 0.5-L baffled separable flask, and the separable flask was equipped with a thermometer, a stirring blade and a cooling tube, and was placed in a hot water bath. Stirring was initiated at 680 rpm under a nitrogen atmosphere. Subsequently, the separable flask was heated by means of the hot water bath, and when the internal temperature reached 85° C., the initiator dispersion liquid was added thereto. While the temperature was maintained at 85° C., the mixture was stirred for 5 hours.

Next, the reaction liquid was cooled, subsequently the reaction liquid thus obtained was filtered through a Nutsche filter, and the filter cake was washed with pure water and isopropyl alcohol. The washed particles were transferred into a plastic bottle and dispersed in water, and decantation was carried out three times to remove fine particles. Porous particles 4 (dry mass of particles: 8.7 g) dispersed in water at 12.5 mass % through the operation described above were obtained. The epoxy group content of the porous particles 4 was 1.7 mmol/g.

The processes were carried out in the same manner as in Example 1, except that the porous particles 4 were used instead of the porous particles 1, and thus a filler for affinity chromatography 4 (A-4) formed from the ligand-bound porous particles 4 having ring-opened epoxy groups, were obtained. The results are presented in Table 3.

2.2.6. Example 5-7

The processes were carried out in the same manner as in Example 4, except that the numbers of parts of the respective monomers relative to 100 parts by mass of the total amount of monomers were adjusted as indicated in Table 3, and thus, fillers for affinity chromatography 5 to 7 (A-5 to A-7) formed from the ligand-bound porous particles having ring-opened epoxy groups were obtained and evaluated. The results are presented in Table 3.

2.2.7. Example 8

0.687 g of polyvinyl alcohol (PVA-217 manufactured by Kuraray Co., Ltd.), 0.071 g of sodium dodecyl sulfate (EMAL 10G, manufactured by Kao Corp.), and 1.78 g of sodium sulfate were added to 343 g of pure water. The mixture was stirred overnight, and thus an aqueous solution (S-4) was prepared. On the day of performing polymerization, 10 g of the solution (S-4) was isolated and set aside.

Subsequently, 8.02 g of glycerol methacrylate (manufactured by NOF Corp.), 1.60 g of 4-hydroxybutyl acrylate glycidyl ether (manufactured by Nippon Kasei Chemical Co., Ltd.), and 6.41 g of trimethylolpropane trimethacrylate (manufactured by Sartomer USA LLC.) were dissolved in 19.4 g of 2-octanone (manufactured by Toyo Gosei Co., Ltd.) and 4.99 g of acetophenone (manufactured by Wako Pure Chemical Industries, Ltd.), and thus a monomer solution was prepared. Further, the numbers of parts of the respective monomers relative to 100 parts by mass of the total mass of the monomers were 50 parts by mass of glycerol methacrylate, 10 parts by mass of 4-hydroxybutyl acrylate glycidyl ether, and 40 parts by mass of trimethylolpropane trimethacrylate.

0.190 g of 2,2'-azoisobutyronitrile (manufactured by Wako Pure Chemical Industries, Ltd.) was added to and dispersed in 10 g of (S-4), and thus, an initiator dispersion liquid was obtained.

Subsequently, the aqueous solution (S-4) and the monomer solution thus obtained were introduced into a 0.5-L baffled separable flask, and the separable flask was equipped with a thermometer, a stirring blade and a cooling tube, and was placed in a hot water bath. Stirring was initiated at 550 rpm under a nitrogen atmosphere. Subsequently, the separable flask was heated by means of the hot water bath, and when the internal temperature reached 85° C., the initiator dispersion liquid was added thereto. While the temperature was maintained at 85° C., the mixture was stirred for 5 hours.

Next, the reaction liquid was cooled, subsequently the reaction liquid thus obtained was filtered through a Nutsche filter, and the filter cake was washed with pure water and isopropyl alcohol. The washed particles were transferred into a plastic bottle and dispersed in water, and decantation was carried out three times to remove fine particles. Porous particles 8 (dry mass of particles: 7.5 g) dispersed in water at 12.5 mass % through the operation described above were obtained. The epoxy group content of the porous particles 8 was 0.33 mmol/g.

The processes were carried out in the same manner as in Example 1, except that the porous particles 8 were used instead of the porous particles 1, and thus, a filler for affinity chromatography 8 (A-8) formed from the ligand-bound porous particles 8 having ring-opened epoxy groups were obtained. The results are presented in Table 4.

2.2.8. Comparative Example 3

The processes were carried out in the same manner as in Example 8, except that the types and numbers of parts of the monomers were adjusted as indicated in Table 4, and thus a comparative filler for affinity chromatography 3 (B-3) was obtained and evaluated. The results are presented in Table 4.

2.2.9. Example 9

The processes were carried out in the same manner as in Example 8, except that the amount of sodium dodecyl sulfate was changed to 0.036 g, the types and numbers of parts of the monomers were adjusted as indicated in Table 4, and the speed of stirring was changed to 450 rpm. Thus, a filler for affinity chromatography 9 (A-9) formed from ligand-bound porous particles 9 having ring-opened epoxy groups was obtained and evaluated. The results are presented in Table 4.

2.2.10 Comparative Example 4

The processes were carried out in the same manner as in Example 9, except that the numbers of parts of the monomers were adjusted as indicated in Table 4, and thus, a comparative filler for affinity chromatography 4 (B-4) was obtained and evaluated. The results are presented in Table 4.

2.2.11. Comparative Example 5

(i) Suspension Polymerization of Porous Particles 8.51 g of polyvinyl alcohol (PVA-217 manufactured by Kuraray Co., Ltd.), 0.425 g of sodium dodecyl sulfate (EMAL 10G, manufactured by Kao Corp.), and 21.3 g of sodium sulfate were added to 4257 g of pure water. The mixture was stirred overnight, and thus an aqueous solution (S-5-1) was prepared. Furthermore, on the day of performing polymerization, 20 g of the solution (S-5-1) was isolated and set aside, and 2.13 g of potassium iodide was dissolved in the remaining of (S-5-1) to prepare an aqueous solution (S-5-2).

Next, 104 g of a monomer composed of 60 mass % of pentaerythritol triacrylate and 40 mass % of pentaerythritol tetraacrylate (trade name: "NK Ester A-TMM-3LM-N" manufactured by Shin Nakamura Chemical Co., Ltd.), 20.7 g of 4-hydroxybutyl acrylate glycidyl ether (manufactured by Nippon Kasei Chemical Co., Ltd.), and 82.9 g of hydroxyethylacrylamide (manufactured by Kohjin Co., Ltd.) were dissolved in 134 g of 2-octanone (manufactured by Toyo Gosei Co., Ltd.) and 169 g of acetophenone (manufactured by Wako Pure Chemical Industries, Ltd.), and thus a monomer solution was prepared. Further, the numbers of parts of the respective monomers relative to 100 parts by mass of the total mass of the monomers were 30 parts of pentaerythritol triacrylate, 20 parts of pentaerythritol tetraacrylate, 10 parts of 4-hydroxybutyl acrylate glycidyl ether, and 40 parts of hydroxyethylacrylamide.

1.92 g of 2,2'-azoisobutyronitrile (manufactured by Wako Pure Chemical Industries, Ltd.) was added to and dispersed in 20 g of (S-5-1), and thus, an initiator dispersion liquid was obtained.

Subsequently, the aqueous solution (S-5-2) and the monomer solution thus prepared were fed into a 7-L baffled separable flask, and the separable flask was equipped with a thermometer, a stirring blade and a cooling tube, and was placed in a hot water bath. Stirring was initiated at 300 rpm under a nitrogen atmosphere. Subsequently, the separable flask was heated by means of the hot water bath, and when the internal temperature reached 80° C., the initiator dispersion liquid was added thereto. While the temperature was maintained at 80° C., the mixture was stirred for 5 hours.

Next, the reaction liquid was cooled, subsequently the reaction liquid thus obtained was filtered through a Nutsche filter, and the filter cake was washed with pure water and isopropyl alcohol. The washed particles were transferred into a plastic bottle and dispersed in water, and decantation was carried out three times to remove fine particles. Porous particles (dry mass of particles: 107 g) dispersed in water at 12.5 mass % through the operation described above were obtained. The epoxy group content of the porous particles was 0.29 mmol/g.

The (ii) Production of ligand, (iii) Binding of porous particles and ligand, and (iv) Evaluation were carried out in the same manner as in Example 1. The results are presented in Table 4.

TABLE 2

| | M-1 GLM | M-2 GMA | M-3 TMP | Content of epoxy group mmol/g | Particle size μm | Pore volume mL/g | Specific surface area m²/g | Pore diameter nm | SPA binding amount mg/g | Liquid volume difference mL | DBC mg/mL | Storage stability % |
|---|---|---|---|---|---|---|---|---|---|---|---|---|
| Example 1 | 50 | 10 | 40 | 0.55 | 58 | 1.22 | 111 | 74 | Z 84 | 0.32 | 43 | 102 |
| Example 2 | 50 | 10 | 40 | 0.55 | 58 | 1.23 | 112 | 76 | T 83 | 0.33 | 44 | 74 |
| Comparative Example 1 | 0 | 60 | 40 | 3.12 | 48 | 1.41 | 105 | 121 | Z 60 | 0.38 | 41 | 63 |
| Comparative Example 2 | 0 | 60 | 40 | 3.12 | 48 | 1.44 | 107 | 119 | T 58 | 0.39 | 43 | 46 |

GLM: Glycerol monomethacrylate
GMA: Glycidyl methacrylate
TMP: Trimethylolpropane trimethacrylate
Regarding the symbols coming before the numerical values of the amount of SPA binding, "Z" represents that SP4Z is bound, and "T" represents that SPATK is bound.

TABLE 3

| | M-1 GLM | M-1 GLDM | M-2 GMA | Content of epoxy group mmol/g | Particle size μm | Pore volume mL/g | Specific surface area m²/g | Pore diameter nm | SPA binding amount mg/g | Liquid volume difference mL | DBC mg/mL | Storage stability % |
|---|---|---|---|---|---|---|---|---|---|---|---|---|
| Example 3 | 20 | 70 | 10 | 0.47 | 54 | 1.38 | 111 | 101 | Z 41 | 0.92 | 40 | 100 |
| Example 4 | 0 | 70 | 30 | 1.7 | 50 | 1.07 | 104 | 68 | T 44 | 0.91 | 39 | 53 |
| Example 5 | 0 | 80 | 20 | 1.1 | 49 | 1.11 | 105 | 70 | T 42 | 0.94 | 38 | 64 |
| Example 6 | 0 | 90 | 10 | 0.62 | 53 | 1.06 | 104 | 68 | T 47 | 0.93 | 33 | 72 |
| Example 7 | 0 | 95 | 5 | 0.31 | 55 | 1.01 | 103 | 63 | T 35 | 0.96 | 29 | 78 |

GLM: Glycerol monomethacrylate
GLDM: Glycerin dimethacrylate
GMA: Glycidyl methacrylate
Regarding the symbols coming before the numerical values of the amount of SPA binding, "Z" represents that SP4Z is bound, and "T" represents that SPATK is bound.

TABLE 4

|  | M-1 | M-2 | M-3 | M-4 | Content of epoxy group mmol/g | Particle size μm | Pore volume mL/g | Specific surface area m²/g | Pore diameter nm | SPA binding amount mg/g | Liquid volume difference mL | DBC mg/mL | Storage stability % |
|---|---|---|---|---|---|---|---|---|---|---|---|---|---|
| Example 8 TA340 | GLM 50 | HBAGE 10 | TMP 40 | — | 0.33 | 43 | 1.12 | 103 | 73 | Z 45 | 0.91 | 35 | 97 |
| Comparative Example 3 TA341 | GLM 30 | HBAGE 10 | TMP 40 | HEAA 20 | 0.50 | 39 | 1.28 | 112 | 80 | Z 98 | 2.29 | 34 | 94 |
| Example 9 TA347 | GLM 60 | GMA 10 | TMP 20 | DVB 10 | 0.49 | 54 | 1.57 | 121 | 120 | Z 77 | 0.39 | 34 | 100 |
| Comparative Example 4 TA349 | GLM 60 | HBAGE 10 | — | DVB 30 | 0.35 | 55 | 1.79 | 132 | 136 | Z 45 | 0.58 | 1 | — |
| Comparative Example 5 | — | HBAGE 10 | HEAA 40 | PETA 50 | 0.29 | 38 | 1.72 | 102 | 169 | Z 70 | 15.6 | 45 | 93 |

GLM: Glycerol monomethacrylate
HBAGE: 4-Hydroxybutyl acrylate glycidyl ether
TMP: Trimethylolpropane trimethacrylate
HEAA: Hydroxyethylacrylamide
GMA: Glycidyl methacrylate
DVB: Divinylbenzene
TMP: Trimethylolpropane trimethacrylate
PETA: Mixture of pentaerythritol triacrylate and pentaerythritol tetraacrylate
Regarding the symbols coming before the numerical values of the amount of SPA binding, "Z" represents that SP4Z is bound, and "T" represents that SPATK is bound.

According to Table 2 to Table 4, it can be seen that when the fillers of Examples 1 to 9 were used, the fillers had larger amounts of ligand retention and superior storage stability, as compared with the cases of using the fillers of Comparative Examples 1 to 5. Furthermore, according to Table 2 to Table 4, it can be seen that when SP4Z was used as the ligand (Examples 1, 3, 8, and 9), the liquid volume difference was smaller, and alkali resistance was more satisfactory.

Descriptions on the embodiments of the present invention are as given above. The present invention is not intended to be limited to the embodiments described above, and various new alterations are possible. Furthermore, the present invention includes constitutions that are substantially identical with the constitutions described in the embodiments (for example, constitutions having identical functions, methods and results, or constitutions having identical purposes and results). Furthermore, the present invention includes constitutions in which the parts that are not essential in the constitutions described in the embodiments have been changed. Further, the present invention includes constitutions which provide the same operating effects, or constitutions which can achieve the same purpose, as the constitutions described in the embodiments. Further, the present invention includes constitutions to which known technologies have been added to the constitutions described in the embodiments.

INDUSTRIAL APPLICABILITY

The filler for affinity chromatography of the present invention has a larger amount of retention for immunoglobulin binding proteins as compared with the conventional carriers, and exhibits superior retention capability for the proteins. Thereby, the amount of capture for target proteins can be increased, and therefore, the binding capacity for target proteins (antibodies) can be increased. Consequently, large amounts of target proteins with high purity can be purified efficiently at low cost.

The invention claimed is:

1. A filler, comprising:
  a porous particle comprising a copolymer comprising:
  (a) 40 to 99.5 parts by mass of (M-1) a methacryloyl group-comprising vinyl monomer comprising a hydroxyl group and not comprising an epoxy group;
  (b) 0.5 to 30 parts by mass of (M-2) an epoxy group comprising vinyl monomer;
  (c) 0 to 59.5 parts by mass of (M-3) a methacryloyl group-comprising vinyl monomer which is different from the monomers (M-1) and (M-2); and
  (d) 0 to 25 parts by mass of (M-4) a vinyl monomer different from the monomers (M-1), (M-2), and (M-3),
  with the proviso that a total amount of (M-1), (M-2), (M-3), and (M-4) is 100 parts by mass;
  a ring-opened epoxy group obtained by ring-opening an epoxy group contained in the copolymer using a blocking agent having a mercapto group; and
  a ligand, which is bound to the porous particle.

2. The filler of claim 1, wherein the ligand is an alkali resistant immunoglobulin binding protein.

3. The filler of claim 1, wherein the monomer (M-1) has formula (A):

$$H_2C=C(CH_3)C(=O)OCH_2CH(OH)-R \quad (A),$$

wherein R is a hydrogen atom or a monovalent organic group.

4. The filler of claim 3, wherein the formula (A), R is a hydroxymethyl group or a methacryloyloxymethyl group.

5. The filler of claim 1, wherein the particle size of the porous particle is in a range from 35 μm to 100 μm.

6. A method for isolating an immunoglobulin, the method comprising:
  performing affinity chromatography with the filler of claim 1, to adsorb an immunoglobulin to the filler;
  eluting the immunoglobulin; and
  washing the filler with an alkaline liquid.

7. A packed column, which is packed with the filler of claim 1.

8. The filler of claim 3, wherein, in formula (A), R is a hydroxymethyl group.

9. The filler of claim 3, wherein, in formula (A), R is a methacryloyloxymethyl group.

10. The filler of claim 1, wherein the content of the monomer (M-2) in the copolymer of the porous particle is from 1 to 20 parts by mass.

11. The filler of claim 1, wherein the monomer (M-3) is present in the copolymer of the porous particle, and present in an amount up to 50 parts by mass.

12. The filler of claim 1, wherein the content of the monomer (M-1) in the copolymer of the porous particle is from 45 to 96 parts by mass.

13. The filler of claim 1, wherein the monomer (M-4) is present in the copolymer of the porous particle, and present in an amount up to 25 parts by mass.

14. The filler of claim 11, wherein the monomer (M-4) is present in the copolymer of the porous particle, and present in an amount up to 25 parts by mass.

15. The filler of claim 1, wherein the particle size of the porous particle is in a range from 38 μm to 75 μm.

16. The filler of claim 1, wherein ring-opened epoxy group is ring-opened by using mercaptoethanol or thyoglycerol.

* * * * *

SEQUENCE LISTING

<160> NUMBER OF SEQ ID NOS: 15

<210> SEQ ID NO 1
<211> LENGTH: 58
<212> TYPE: PRT
<213> ORGANISM: Staphylococcus aureus
<220> FEATURE:
<223> OTHER INFORMATION: Z domain

<400> SEQUENCE: 1

Val Asp Asn Lys Phe Asn Lys Glu Gln Gln Asn Ala Phe Tyr Glu Ile
1               5                   10                  15

Leu His Leu Pro Asn Leu Asn Glu Glu Gln Arg Asn Ala Phe Ile Gln
            20                  25                  30

Ser Leu Lys Asp Asp Pro Ser Gln Ser Ala Asn Leu Leu Ala Glu Ala
        35                  40                  45

Lys Lys Leu Asn Asp Ala Gln Ala Pro Lys
    50                  55

```
<210> SEQ ID NO 2
<211> LENGTH: 258
<212> TYPE: PRT
<213> ORGANISM: Staphylococcus aureus
<220> FEATURE:
<223> OTHER INFORMATION: SP4Z

<400> SEQUENCE: 2
```

Met Lys His His His His His His Pro Met Ser Asp Tyr Asp Ile Pro
1               5                   10                  15

Thr Thr Glu Asn Leu Tyr Phe Gln Gly Ala Met Val Val Asp Asn Lys
            20                  25                  30

Phe Asn Lys Glu Gln Gln Asn Ala Phe Tyr Glu Ile Leu His Leu Pro
        35                  40                  45

Asn Leu Asn Glu Glu Gln Arg Asn Ala Phe Ile Gln Ser Leu Lys Asp
    50                  55                  60

Asp Pro Ser Gln Ser Ala Asn Leu Leu Ala Glu Ala Lys Lys Leu Asn
65                  70                  75                  80

Asp Ala Gln Lys Glu Phe Val Asp Asn Lys Phe Asn Lys Glu Gln Gln
                85                  90                  95

Asn Ala Phe Tyr Glu Ile Leu His Leu Pro Asn Leu Asn Glu Glu Gln
            100                 105                 110

Arg Asn Ala Phe Ile Gln Ser Leu Lys Asp Asp Pro Ser Gln Ser Ala
        115                 120                 125

Asn Leu Leu Ala Glu Ala Lys Lys Leu Asn Asp Ala Gln Lys Glu Leu
    130                 135                 140

Val Asp Asn Lys Phe Asn Lys Glu Gln Gln Asn Ala Phe Tyr Glu Ile
145                 150                 155                 160

Leu His Leu Pro Asn Leu Asn Glu Glu Gln Arg Asn Ala Phe Ile Gln
                165                 170                 175

Ser Leu Lys Asp Asp Pro Ser Gln Ser Ala Asn Leu Leu Ala Glu Ala
            180                 185                 190

Lys Lys Leu Asn Asp Ala Gln Lys Lys Leu Val Asp Asn Lys Phe Asn
        195                 200                 205

Lys Glu Gln Gln Asn Ala Phe Tyr Glu Ile Leu His Leu Pro Asn Leu
    210                 215                 220

Asn Glu Glu Gln Arg Asn Ala Phe Ile Gln Ser Leu Lys Asp Asp Pro
225                 230                 235                 240

Ser Gln Ser Ala Asn Leu Leu Ala Glu Ala Lys Lys Leu Asn Asp Ala
                245                 250                 255

Gln Lys

```
<210> SEQ ID NO 3
<211> LENGTH: 213
<212> TYPE: DNA
<213> ORGANISM: Staphylococcus aureus
<220> FEATURE:
<223> OTHER INFORMATION: SPZK DNA

<400> SEQUENCE: 3
```
atgcatcatc atcatcatca cgtgaattcg ctcgaggtgg ataacaaatt caacaaagaa    60
caacaaaatg ctttctatga aatcttacat ttacctaact taaacgaaga acaacgcaat   120
gctttcatcc aaagcctaaa agatgaccca agccaaagcg ctaaccttt agcagaagct   180 aaaaagctaa atgatgcaca aggatctaaa taa                                213

<210> SEQ ID NO 4
<211> LENGTH: 291
<212> TYPE: PRT
<213> ORGANISM: Staphylococcus aureus
<220> FEATURE:
<223> OTHER INFORMATION: SPATK

<400> SEQUENCE: 4

```
Met Lys His His His His His His Pro Met Ser Asp Tyr Asp Ile Pro
1               5                   10                  15

Thr Thr Glu Asn Leu Tyr Phe Gln Gly Ala Met Ala Lys Ala Asp Ala
            20                  25                  30

Gln Gln Asn Asn Phe Asn Lys Asp Gln Gln Ser Ala Phe Tyr Glu Ile
        35                  40                  45

Leu Asn Met Pro Asn Leu Asn Glu Ala Gln Arg Asn Gly Phe Ile Gln
50                  55                  60

Ser Leu Lys Asp Asp Pro Ser Gln Ser Thr Asn Val Leu Gly Glu Ala
65                  70                  75                  80

Lys Lys Leu Asn Glu Ser Gln Ala Pro Lys Ala Asp Asn Asn Phe Asn
                85                  90                  95

Lys Glu Gln Gln Asn Ala Phe Tyr Glu Ile Leu Asn Met Pro Asn Leu
            100                 105                 110

Asn Glu Glu Gln Arg Asn Gly Phe Ile Gln Ser Leu Lys Asp Asp Pro
        115                 120                 125

Ser Gln Ser Ala Asn Leu Leu Ser Glu Ala Lys Lys Leu Asn Glu Ser
130                 135                 140

Gln Ala Pro Lys Ala Asp Asn Lys Phe Asn Lys Glu Gly Ser Ser Gly
145                 150                 155                 160

Lys Ala Asp Ala Gln Gln Asn Asn Phe Asn Lys Asp Gln Gln Ser Ala
                165                 170                 175

Phe Tyr Glu Ile Leu Asn Met Pro Asn Leu Asn Glu Ala Gln Arg Asn
            180                 185                 190

Gly Phe Ile Gln Ser Leu Lys Asp Asp Pro Ser Gln Ser Thr Asn Val
        195                 200                 205

Leu Gly Glu Ala Lys Lys Leu Asn Glu Ser Gln Ala Pro Lys Ala Asp
210                 215                 220

Asn Asn Phe Asn Lys Glu Gln Gln Asn Ala Phe Tyr Glu Ile Leu Asn
225                 230                 235                 240

Met Pro Asn Leu Asn Glu Glu Gln Arg Asn Gly Phe Ile Gln Ser Leu
                245                 250                 255

Lys Asp Asp Pro Ser Gln Ser Ala Asn Leu Leu Ser Glu Ala Lys Lys
            260                 265                 270

Leu Asn Glu Ser Gln Ala Pro Lys Ala Asp Asn Lys Phe Asn Lys Glu
        275                 280                 285

Gly Ser Lys
290
```

<210> SEQ ID NO 5
<211> LENGTH: 38
<212> TYPE: DNA
<213> ORGANISM: Artificial
<220> FEATURE:
<223> OTHER INFORMATION: primer containing NcoI cutting site

<400> SEQUENCE: 5
ggaggaccat ggttgtggat aacaaattca acaaagaa                    38

<210> SEQ ID NO 6
<211> LENGTH: 39
<212> TYPE: DNA
<213> ORGANISM: Artificial
<220> FEATURE:
<223> OTHER INFORMATION: primer containing EcoRI cutting site

<400> SEQUENCE: 6
ggtggtgaat tcttttttgtg catcatttag cttttttagc                    39

<210> SEQ ID NO 7
<211> LENGTH: 37
<212> TYPE: DNA
<213> ORGANISM: Artificial
<220> FEATURE:
<223> OTHER INFORMATION: primer containing EcoRI cutting site

<400> SEQUENCE: 7
ggaggagaat tcgtggataa caaattcaac aaagaac                        37

<210> SEQ ID NO 8
<211> LENGTH: 36
<212> TYPE: DNA
<213> ORGANISM: Artificial
<220> FEATURE:
<223> OTHER INFORMATION: primer containing SacI cutting site

<400> SEQUENCE: 8
ggtggtgagc tcctattttt gtgcatcatt tagctt                         36

<210> SEQ ID NO 9
<211> LENGTH: 33
<212> TYPE: DNA
<213> ORGANISM: Artificial
<220> FEATURE:
<223> OTHER INFORMATION: primer containing SacI cutting site

<400> SEQUENCE: 9
ggtggtgagc tcttttttgtg catcatttag ctt                           33

<210> SEQ ID NO 10
<211> LENGTH: 36
<212> TYPE: DNA
<213> ORGANISM: Artificial
<220> FEATURE:
<223> OTHER INFORMATION: primer containing SacI cutting site

<400> SEQUENCE: 10
ggaggagagc tcgtggataa caaattcaac aaagaa                         36

<210> SEQ ID NO 11
<211> LENGTH: 39
<212> TYPE: DNA
<213> ORGANISM: Artificial
<220> FEATURE:
<223> OTHER INFORMATION: primer containing HindIII cutting site

<400> SEQUENCE: 11
ggtggtaagc ttttttgtg catcatttag cttttttagc                      39

<210> SEQ ID NO 12
<211> LENGTH: 36
<212> TYPE: DNA
<213> ORGANISM: Artificial
<220> FEATURE:
<223> OTHER INFORMATION: primer containing HindIII cutting site

```
<400> SEQUENCE: 12
ggaggaaagc ttgtggataa caaattcaac aaagaa                                    36

<210> SEQ ID NO 13
<211> LENGTH: 36
<212> TYPE: DNA
<213> ORGANISM: Artificial
<220> FEATURE:
<223> OTHER INFORMATION: primer containing XhoI cutting site

<400> SEQUENCE: 13
ggtggtctcg agctattttt gtgcatcatt tagctt                                    36

<210> SEQ ID NO 14
<211> LENGTH: 33
<212> TYPE: DNA
<213> ORGANISM: Artificial
<220> FEATURE:
<223> OTHER INFORMATION: primer containing NcoI cutting site

<400> SEQUENCE: 14
catgccatgg cgaaagctga tgcgcaacaa aat                                       33

<210> SEQ ID NO 15
<211> LENGTH: 36
<212> TYPE: DNA
<213> ORGANISM: Artificial
<220> FEATURE:
<223> OTHER INFORMATION: primer containing HindIII cutting site

<400> SEQUENCE: 15
cggggatcct caggcaaagc tgatgcgcaa caaaat                                    36
```